US011548147B2

(12) United States Patent
Jia

(10) Patent No.: US 11,548,147 B2
(45) Date of Patent: Jan. 10, 2023

(54) METHOD AND DEVICE FOR ROBOT INTERACTIONS

(71) Applicant: Alibaba Group Holding Limited, Grand Cayman (KY)

(72) Inventor: Zijun Jia, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 161 days.

(21) Appl. No.: 16/646,266

(22) PCT Filed: Sep. 18, 2018

(86) PCT No.: PCT/CN2018/106103
§ 371 (c)(1),
(2) Date: Mar. 11, 2020

(87) PCT Pub. No.: WO2019/057019
PCT Pub. Date: Mar. 28, 2019

(65) Prior Publication Data
US 2020/0282555 A1 Sep. 10, 2020

(30) Foreign Application Priority Data

Sep. 20, 2017 (CN) .......................... 201710851144.1

(51) Int. Cl.
G05B 13/02 (2006.01)
G06N 3/00 (2006.01)
B25J 9/16 (2006.01)

(52) U.S. Cl.
CPC .......... B25J 9/163 (2013.01); G05B 13/0265 (2013.01); G06N 3/008 (2013.01)

(58) Field of Classification Search
CPC ....... G06N 3/008; B25J 11/0005; B25J 9/161; B25J 11/0015; G05B 2219/35444; G05B 2219/40414; G05B 2219/39254
See application file for complete search history.

(56) References Cited

U.S. PATENT DOCUMENTS 5,890,906 A 4/1999 Macri et al.
6,164,973 A 12/2000 Macri et al.
(Continued)

FOREIGN PATENT DOCUMENTS

CN 105825268 A 8/2016
JP 2002113680 A 4/2002
(Continued)

OTHER PUBLICATIONS

Lee, Christopher, et al. Online, Interactive Learning of Gestures for Human/Robot Interfaces, Proceedings of the 1996 IEEE International Conference on Robotics and Automation Minneapolis. Minnesota—Apr. 1996 (Year: 1996).*
(Continued)

Primary Examiner — Ryan Rink
(74) Attorney, Agent, or Firm — James J. DeCarlo; Greenberg Traurig, LLP

(57) ABSTRACT

Embodiments of the disclosure provide a method and device for robot interactions. In one embodiment, a method comprises: collecting to-be-processed data reflecting an interaction output behavior; determining robot interaction output information corresponding to the to-be-processed data; controlling a robot to execute the robot interaction output information to imitate the interaction output behavior; collecting, in response to an imitation termination instruction triggered when the imitation succeeds, interaction trigger information corresponding to the robot interaction output information; and storing the interaction trigger information in relation to the robot interaction output information to generate an interaction rule.

20 Claims, 23 Drawing Sheets

(56) References Cited

U.S. PATENT DOCUMENTS

| | | | |
|---|---|---|---|
| 6,220,865 B1 | 4/2001 | Macri et al. | |
| 6,347,261 B1* | 2/2002 | Sakaue | B25J 9/1694 |
| | | | 345/156 |
| 8,287,434 B2 | 10/2012 | Zavadsky et al. | |
| 8,315,454 B2 | 11/2012 | Tanaka et al. | |
| 8,909,370 B2 | 12/2014 | Stiehl et al. | |
| 8,938,289 B2 | 1/2015 | Einav et al. | |
| 9,052,710 B1* | 6/2015 | Farwell | B25J 9/1656 |
| 9,079,311 B2 | 7/2015 | Wang et al. | |
| 9,283,476 B2 | 3/2016 | Mityagin et al. | |
| 9,323,250 B2 | 4/2016 | Wang et al. | |
| 9,375,845 B1* | 6/2016 | Annan | B25J 11/0005 |
| 9,613,310 B2 | 4/2017 | Buibas et al. | |
| 10,548,511 B2 | 2/2020 | Kruger | |
| 2002/0165642 A1* | 11/2002 | Sakaue | B25J 13/084 |
| | | | 700/245 |
| 2004/0097330 A1 | 5/2004 | Edgerton et al. | |
| 2006/0056678 A1* | 3/2006 | Tanaka | G06N 3/008 |
| | | | 382/153 |
| 2006/0277074 A1 | 12/2006 | Einav et al. | |
| 2007/0128979 A1 | 6/2007 | Shackelford et al. | |
| 2009/0004635 A1 | 1/2009 | Kato | |
| 2012/0197436 A1* | 8/2012 | Maisonnier | B25J 9/1656 |
| | | | 700/250 |
| 2012/0283746 A1 | 11/2012 | Hu et al. | |
| 2013/0123987 A1* | 5/2013 | Kase | A63H 30/04 |
| | | | 700/259 |
| 2014/0012415 A1* | 1/2014 | Benaim | G06F 30/00 |
| | | | 700/248 |
| 2014/0100491 A1 | 4/2014 | Hu et al. | |
| 2018/0021956 A1* | 1/2018 | Atherton | B25J 9/1679 |
| | | | 700/259 |
| 2018/0117762 A1* | 5/2018 | Earwood | B25J 11/0015 |
| 2018/0229372 A1* | 8/2018 | Breazeal | B25J 11/001 |
| 2019/0009133 A1 | 1/2019 | Mettler May et al. | |
| 2019/0118386 A1* | 4/2019 | Okumura | H04R 1/025 |
| 2019/0122319 A1 | 4/2019 | Stephenson | |
| 2019/0314985 A1* | 10/2019 | Sermanet | G06N 3/084 |
| 2021/0205986 A1* | 7/2021 | Kalouche | B25J 9/1689 |

FOREIGN PATENT DOCUMENTS

| | | |
|---|---|---|
| JP | 2003324709 A | 11/2003 |
| JP | 2008307662 A | 12/2008 |
| JP | 2011215922 A | 10/2011 |

OTHER PUBLICATIONS

Duan et al., "One-Shot Imitation Learning," retrieved from the interrnet: URL:https://arxiv.org/pdf/1703.07326v2.pdf, pp. 1-23 (2017).

Supplementary EP Search Report to corresponding EP Application No. 18857745 dated Jun. 4, 2021 (12 pages).

Office Action to corresponding JP Application No. 2020-515017 dated Aug. 23, 2022 (3 pages).

\* cited by examiner

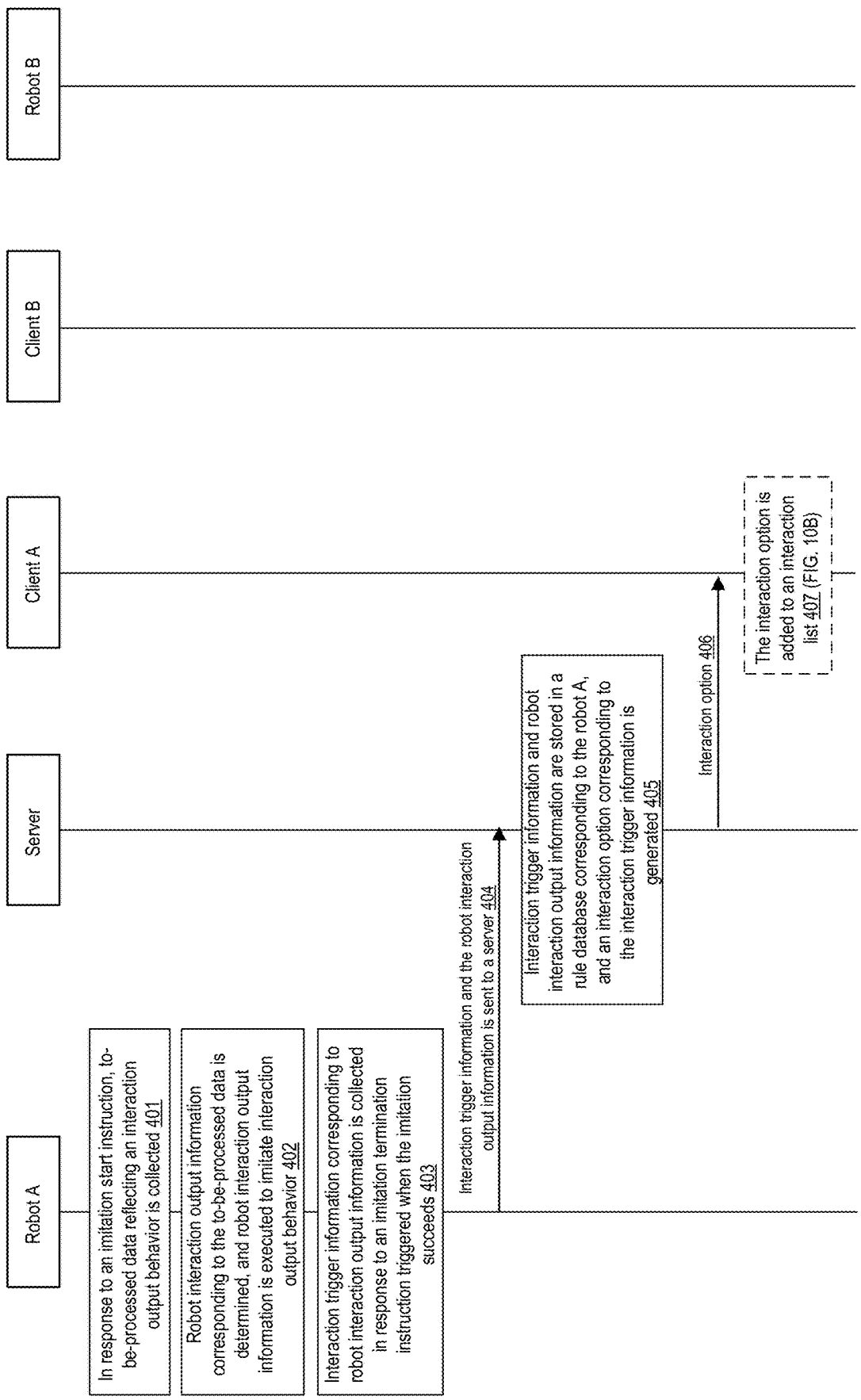

METHOD AND DEVICE FOR ROBOT INTERACTIONS

CROSS-REFERENCE TO RELATED APPLICATIONS

The present application is a national stage entry of Int'l Appl. No. PCT/CN2018/106103, filed on Sep. 18, 2018, which claims the benefit of priority to Chinese Patent Application No. 201710851144.1, filed on Sep. 20, 2017, both of which are incorporated herein by reference in their entirety.

BACKGROUND

Technical Field

The disclosure relates to the field of artificial intelligence technologies, and in particular, to methods and devices for robot interactions.

Description of Related Art

In recent years, with the development of both robot technologies and artificial intelligence research, intelligent mobile robots have started to play an increasingly important role in human lives in a variety of fields.

To enhance its intelligence, a robot can be configured with a variety of interaction capabilities. For example, in general, robots are able to respond in interactions with a user via various manners, such as sound, display, light, and motion, or any combination thereof.

Presently, content design for feedback on input information (e.g., voice, facial features, and touch) is implemented by manually designing a rule collection. In other words, a mapping relationship between the input to an output from a robot is manually defined. When the input meets a certain condition, corresponding output of voice, display content, lighting effect, dynamic effect, and the like are produced based on the mapping relationship. For example, a designer can specify in a rule dictating that, when a robot recognizes, through voice recognition techniques, that the user has said "hello," as well as, through facial expression recognition techniques, that the user is "smiling" at the same time, the robot outputs a vocal response of "Hello yourself, you seem to be in a good mood."

As such, in current systems employing such manual methods to generate a collection of interaction rules, all such rules need to be manually specified in advance, which is time-consuming and labor-intensive, resulting in overly programmed, stereotyped, and inflexible interactions from robots.

SUMMARY

Embodiments of the disclosure provide methods and devices for robot interactions to enable personalized robot interactions for a new user.

In one embodiment, the disclosure provides a method for robot interactions, applied to a robot, the method comprising: collecting to-be-processed data reflecting an interaction output behavior; determining robot interaction output information corresponding to the to-be-processed data; controlling the robot to execute the robot interaction output information to imitate the interaction output behavior; collecting interaction trigger information corresponding to the robot interaction output information in response to an imitation termination instruction triggered when the imitation succeeds; and storing the interaction trigger information in relation to the robot interaction output information.

In one embodiment, the disclosure provides an apparatus for robot interactions, applied at a robot, the apparatus comprising: a collecting module configured to collect to-be-processed data reflecting an interaction output behavior; a determining module configured to determine robot interaction output information corresponding to the to-be-processed data; a control module configured to control the robot to execute the robot interaction output information to imitate the interaction output behavior, wherein the collecting module is further configured to collect interaction trigger information corresponding to the robot interaction output information in response to an imitation termination instruction triggered when the imitation succeeds; and a storage processing module configured to store the interaction trigger information in relation to the robot interaction output information.

In one embodiment, the disclosure provides an electronic device implemented as a robot, the electronic device comprising a processor and a memory, wherein the memory is configured to store a program, when executed by the processor, instructing the robot to perform the methods for robot interactions described herein. In some embodiments, the electronic device further comprises a communication interface configured to communicate with another device or a communication network.

In one embodiment, the disclosure provides a computer storage medium configured to store computer software instructions used by an electronic device, the computer storage medium comprising a program for performing the method for robot interactions of the disclosure as described above.

In one embodiment, the disclosure provides a method for robot interactions, applied at a client, the method comprising: adding, to an interaction list, an interaction option that corresponds to interaction trigger information and is sent by a server, the interaction option being generated by the server after storing the interaction trigger information in relation to the robot interaction output information. The robot interaction output information is required by a robot for imitating a to-be-imitated interaction behavior, and the interaction trigger information is used for triggering the robot to execute the robot interaction output information; and sending a playback instruction to the robot in response to a playback operation triggered by a user according to the interaction option, wherein the playback instruction comprises the interaction trigger information so that the robot acquires the robot interaction output information from the server and executes the robot interaction output information.

In one embodiment, the disclosure provides an apparatus for robot interactions, applied at a client, the apparatus comprising: an adding module configured to add, to an interaction list, an interaction option corresponding to interaction trigger information and sent by a server, the interaction option being generated by the server after storing the interaction trigger information in relation to the robot interaction output information, the robot interaction output information being information required by a robot for imitating a to-be-imitated interaction behavior, and the interaction trigger information being used for triggering the robot to execute the robot interaction output information; and a sending module configured to send a playback instruction to the robot in response to a playback operation triggered by a user according to the interaction option, wherein the playback instruction comprises the interaction trigger information such that the robot obtains the robot interaction output information from the server and executes the robot interaction output information.

In one embodiment, the disclosure provides an electronic device implemented as a user device such as a smartphone, the electronic device comprising a processor and a memory, wherein the memory is configured to store a program, when executed by the processor, instructing the electronic device to perform the method for robot interactions in the disclosure as described above. In some embodiments, the electronic device further comprises a communication interface configured to communicate with another device or a communication network.

In one embodiment, the disclosure provides a computer storage medium configured to store computer software instructions used by an electronic device, the computer storage medium comprising a program for performing the method for robot interactions of the disclosure as described above.

In one embodiment, the disclosure provides a method for robot interactions, applied at a server, the method comprising: storing interaction trigger information in relation to the robot interaction output information sent by a robot, wherein the robot interaction output information is information required by the robot for imitating a to-be-imitated interaction behavior, and the interaction trigger information is used for triggering the robot to execute the robot interaction output information; generating an interaction option corresponding to the interaction trigger information; and sending the interaction option to a client corresponding to the robot such that the client adds the interaction option to an interaction list.

In one embodiment, the disclosure provides an apparatus for robot interactions, applied at a server, the apparatus comprising: a storage module configured to store interaction trigger information in relation to robot interaction output information sent by a robot, wherein the robot interaction output information is information required by the robot for imitating a to-be-imitated interaction behavior, and the interaction trigger information is used for triggering the robot to execute the robot interaction output information; a generating module configured to generate an interaction option corresponding to the interaction trigger information; and a sending module configured to send the interaction option to a client corresponding to the robot such that the client adds the interaction option to an interaction list.

In one embodiment, the disclosure provides an electronic device implemented as a server, the electronic device comprising a processor and a memory, wherein the memory is configured to store a program, when executed by the processor, instructing the electronic device to perform the method for robot interactions of the disclosure as described above. In some embodiments, the electronic device further comprises a communication interface configured to communicate with another device or a communication network.

In one embodiment, the disclosure provides a computer storage medium configured to store computer software instructions used by an electronic device, the computer storage medium comprising a program for performing the method for robot interactions of the disclosure as described above.

In one embodiment, the disclosure provides a method for robot interactions, applied at a robot, the method comprising: collecting to-be-processed data reflecting an interaction output behavior; determining, according to the to-be-processed data, robot interaction output information required by the robot for imitating the interaction output behavior; and storing the robot interaction output information.

In one embodiment, the disclosure provides an apparatus for robot interactions, applied at a robot, the apparatus comprising: a collecting module configured to collect to-be-processed data reflecting an interaction output behavior; a determining module configured to determine, according to the to-be-processed data, robot interaction output information required by the robot for imitating the interaction output behavior; and a storage module configured to store the robot interaction output information.

In one embodiment, the disclosure provides an electronic device implemented as a robot, the electronic device comprising a processor and a memory, wherein the memory is configured to store a program, when executed by the processor, instructing the electronic device to perform methods for robot interactions of the disclosure as described above. In some embodiments, the electronic device further comprises a communication interface configured to communicate with another device or a communication network.

In one embodiment, the disclosure provides a computer storage medium configured to store computer software instructions used by the electronic device, the computer storage medium comprising a program for performing the method for robot interactions of the disclosure as described above.

To enable a robot with personalized interaction capabilities, embodiments of the disclosure provide a method and device for a user to teach the robot through words and actions such that the robot can imitate behaviors of the user to learn interactive responses. Specifically, after the robot enters a learning mode, the user performs an interaction output behavior required to be imitated by the robot, thereby allowing the robot to collect, by a corresponding collecting apparatus, to-be-processed data that reflects the interaction output behavior. For example, such data can include vocal utterance of the user, a depth image comprising user motion information, etc.

Furthermore, by analyzing the to-be-processed data, robot interaction output information corresponding to the to-be-processed data is determined, that is, mapping of human behavior to a robot behavior is achieved, thereby obtaining the robot interaction output information required by the robot to imitate the interaction output behavior of the user. Then, the robot is controlled to execute the robot interaction output information to imitate the interaction output behavior of the user. When in receipt of an imitation termination instruction triggered by the user when finding that the imitation succeeds, the interaction trigger information corresponding to the robot interaction output information, e.g., the trigger information for triggering the robot to execute the robot interaction output information, is collected. Therefore, the interaction trigger information and relation to the robot interaction output information are stored to generate an interaction rule describing a corresponding relationship between the trigger condition and the output response.

Using these technical solutions, a robot learns automatically to obtain interaction rules. That is, the robot automatically collects the interaction trigger information, and automatically learns the robot interaction output information by imitating the interaction output behavior of a user, thereby achieving simplicity and convenience in robot interactions. In addition, robots trained by different users have different interaction rules based on different interaction habits, achieving multitudes of personalized interaction capabilities of robots.

BRIEF DESCRIPTION OF THE DRAWINGS

The drawings to be used for the description of the embodiments are briefly introduced below. The drawings in the following description are some embodiments of the disclosure. Those of ordinary skill in the art can further obtain other accompanying drawings according to these accompanying drawings without significant efforts.

FIGS. 10A and 10B are interaction flow diagrams illustrating a method for robot interactions according to some embodiments of the disclosure.

DETAILED DESCRIPTION

Figure 1A:
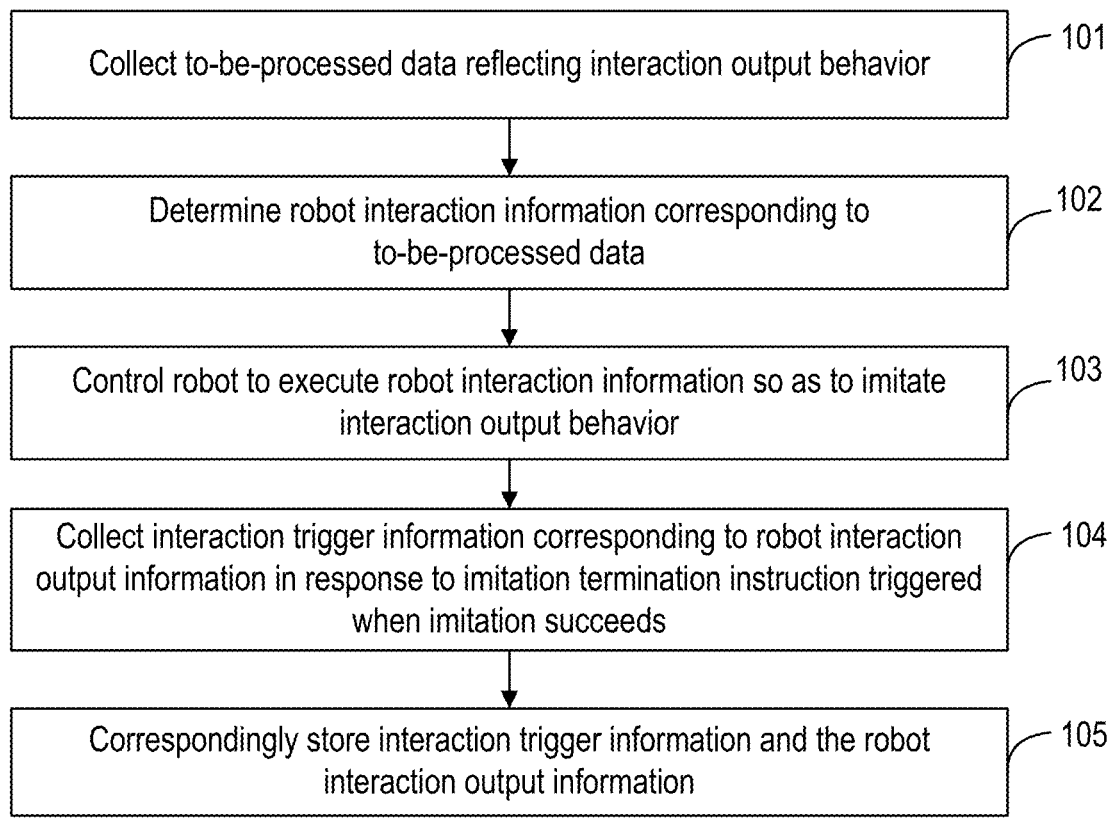
FIG. 1A is a flow diagram illustrating a method for robot interactions according to some embodiments of the disclosure.

To make the purposes, technical solutions, and advantages of the embodiments of the disclosure clearer, the technical solutions in the embodiments of the disclosure will be described clearly and completely below with reference to the drawings in the embodiments of the disclosure. The embodiments described herein are merely some, rather than all of the embodiments of the disclosure. Based on the embodiments of the disclosure, all other embodiments obtained by those of ordinary skill in the art without making significant efforts fall within the scope of the disclosure.

The terminology used in the embodiments of the disclosure is for the purpose of describing particular embodiments only and is not intended to limit the disclosure. The singular forms "a," "said," and "the" used in the embodiments of the disclosure and the appended claims are also intended to include the plural forms unless the context clearly indicates another meaning. For "a plurality of," at least two are included generally, but the case where at least one is included is not excluded.

It should be understood that the term "and/or" used herein is merely used for describing an association relationship of associated objects, and indicates that three relationships can exist. For example, A and/or B can indicate the following three cases: A exists alone, both A and B exist, and B exists alone. In addition, the character "/" herein generally indicates that the associated objects before and after it are in an "or" relationship.

Although terms first, second, third, etc. may be used to describe features in the embodiments of the disclosure, these features should not be limited to these terms. These terms are only used to distinguish features from each other. For example, without departing from the scope of the embodiments of the disclosure, a first feature may also be referred to as a second feature, and similarly, a second feature may also be referred to as a first feature.

Depending on the context, the words "if" and "in case of" as used herein can be interpreted as "at the time" or "when" or "in response to the determination" or "in response to the detection." Similarly, depending on the context, the phrase "if it is determined" or "if (the stated condition or event) is detected" can be interpreted as "when it is determined" or "in response to the determination" or "when (the stated condition or event) is detected" or "in response to the detection of (the stated condition or event)."

It should also be noted that the terms "include," "comprise," or any other variation thereof are intended to encompass non-exclusive inclusions, so that a commodity or system including a series of elements includes not only those elements but also other elements that are not explicitly listed, or includes elements that are inherent to this commodity or system. Without more restrictions, an element defined by the sentence "including a(n) . . . " does not exclude the existence of another identical element in the commodity or system including the element.

In addition, some processes described herein or depicted in the drawings include a plurality of operations occurring in a specific sequence. However, these operations may not be performed in the specific sequence depicted or may be performed in parallel. An operational sequence only services as an illustrating example, not intended as a limitation in any manner.

FIG. 1A is a flow diagram illustrating a method for robot interactions according to some embodiments of the disclosure. In some embodiments, the method is performed by an apparatus for robot interactions, which may be implemented as software, hardware, or as a combination thereof. In some embodiments, the apparatus for robot interactions is provided at a robot. FIGS. 1B through 1H are diagrams illustrating a robot interaction method of FIG. 1A according to some embodiments of the disclosure. The method for robot interactions is described below with reference to both FIG. 1A and FIGS. 1B through 1H. In one embodiment, as shown in FIG. 1A, the method includes the following steps.

Step 101: collect to-be-processed data reflecting an interaction output behavior.

To enhance the interaction capabilities of a robot, a corresponding relationship between interaction input and interaction output is established to generate one or more interaction rules, which specify which interaction output feedbacks are performed by the robot in response to which trigger conditions.

In one embodiment, an interaction rule includes interaction trigger information and robot interaction output information. The interaction trigger information is input information triggered by an interacting party in a human-machine interaction scenario. The robot interaction output information is output feedback that is to be performed by the robot in response to the interaction trigger information. In some embodiments, generating an interaction rule is a process in which the robot learns robot interaction output information, and collects interaction trigger information corresponding to the robot interaction output information, thereby storing the interaction trigger information in relation to the robot interaction output information.

In one embodiment, the robot obtains robot interaction output information through learning or imitating an interaction output behavior of a trainer. The trainer may be a person, a robot, a video including an interaction output behavior, and the like. When a trainer is a person, the person performs an interaction output behavior that the robot is to imitate, and the robot collects the to-be-processed data corresponding to the interaction output behavior. The robot then analyzes the to-be-processed data to obtain the robot interaction output information required by the robot for imitating the interaction output behavior. That is, an interaction output effect of the robot is achieved by a human who teaches the robot.

As used herein, a subject that triggers the interaction output behavior is referred to as a trainer. In some embodiments, The trainer performs the interaction output behavior for the robot to imitate and/or learn. For example, the interaction output behavior is that the trainer lifts the right hand and says "hello" with a smile. Accordingly, the to-be-processed data corresponding to the interaction output behavior is collected by various collecting apparatuses of the robot.

In some embodiments, the to-be-processed data includes at least one of the following: a depth image, a color image, and an interactive vocal utterance (such as voices, sounds, speech, etc.). Referring to the above-described example, the depth image can reflect a body motion of the trainer, e.g., the process of lifting the right hand; the color image can reflect a facial expression feature of the trainer, e.g., a smile; and the interactive vocal utterance can reflect a speech uttered by the trainer, e.g., hello.

The aforementioned depth image and color image are not limited to one image. In some embodiments, the depth image or color image includes an image sequence. The above examples are not intended to limit the disclosed embodiments in any manner.

Figure 1B:
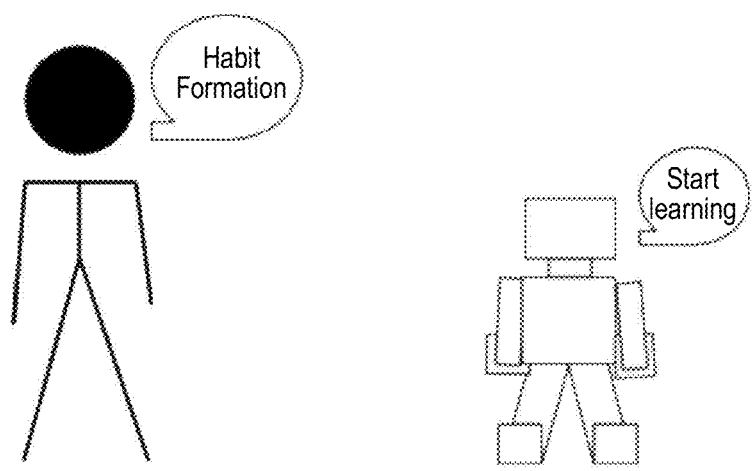
FIGS. 1B through 1H are diagrams illustrating a robot interaction method according to some embodiments of the disclosure.

In some embodiments, the robot processes human-machine interactions other than the above-described interactions. To distinguish between the two, a working mode of the robot can be defined as a normal working mode and a learning mode. Only when the robot is triggered to enter the learning mode, the method provided by embodiments of the disclosure is performed such that the robot automatically learns interaction rules. In some embodiments, a trigger condition that triggers the robot to enter the learning mode is a specific voice instruction from the trainer, such as a speech of "habit formation" or "start learning," as shown in FIG. 1B. As such, after the robot collects and recognizes the specific voice instruction, the robot enters the learning mode to learn robot interaction output information by imitating the interaction behavior of the trainer.

Step 102: determine robot interaction output information corresponding to the to-be-processed data.

To imitate the interaction output behavior of the trainer, the to-be-processed data collected needs to be mapped to the robot interaction output information of the robot.

In some embodiments, the robot interaction output is manifested in one or more of a plurality of forms including, for example, voice, motion, and display. Using an example where the to-be-processed data includes the information of these three forms, the following describes the determining the robot interaction output information corresponding to the to-be-processed data.

Still using the above-described example with reference to the trainer, if the to-be-processed data includes the interactive voice utterance of "hello," it is determined that the robot interaction output information also includes the same interactive voice utterance. This way, the collected interactive voice utterance is used as part of the robot interaction output information.

If the to-be-processed data includes a color image reflecting the facial expression feature (e.g., a smile of the trainer by performing facial expression recognition on the color image), an expression object corresponding to a recognized facial expression is determined from a preset expression library. This way, the matched expression object is used as part of the robot interaction output information. The process of facial expression recognition can be implemented by using existing suitable technologies, the details of which are not be described herein. In some embodiments, results of the expression recognition include expressions of emotions such as happiness, anger, surprise, fear, disgust, sadness, and the like. In some embodiments, an expression library including expression objects corresponding to various expression recognition results is constructed in advance. In some embodiments, the expression objects are expression animations or expression images.

If the to-be-processed data includes a depth image reflecting a body motion of the trainer (e.g., lifting the right hand), bone recognition is performed on the depth image to obtain human joint posture information, which is used to determine corresponding robot joint posture information. This way, the determined robot joint posture information is used as part of the robot interaction output information. In some embodiments, bone recognition is implemented by using existing suitable technologies, the details of which are not described herein. In some embodiments, the results of bone recognition (e.g., the human joint posture information) includes a motion sequence performed by a plurality of joints of a human body, reflecting a series of motion trajectories of the plurality of human joints. In some embodiments, the joints of the robot may not correspond one-to-one to the joints of the human body, depending on the humanoid degree of the robot. Therefore, in some embodiments, in the process of mapping the human joint posture information to the robot joint posture information, both the mapping of joints and the mapping of joint postures are involved. In this scenario, a mapping relationship between the human joints and the robot joints are established in advance to determine a mapping relationship between the human joint postures and the robot joint postures.

In one example, corresponding to the motion of lifting the right hand, posture information of human joints is determined relative to a reference line in the human coordinate system. As such, the posture information includes the following respective angles of the joints, at different time points, with respect to the reference line:

Joint 1: 30 degrees, 40 degrees, 50 degrees . . . ;
Joint 2: 20 degrees, 30 degrees, 40 degrees . . . .
Joint 3: 40 degrees, 50 degrees, 60 degrees . . . .
Joint 4: 40 degrees, 50 degrees, 60 degrees . . . .

The posture information of the robot joints is determined relative to a reference line in the robot coordinate system. As such, the posture information of the robot joints includes the following respective angles of the joints corresponding to the human joints, at different time points, with respect to the reference line are:

Joint a: 10 degrees, 40 degrees, 54 degrees . . . .
Joint b: 10 degrees, 23 degrees, 52 degrees . . . .

Step 103: control the robot to execute the robot interaction output information to imitate the interaction output behavior.

Figure 1C:
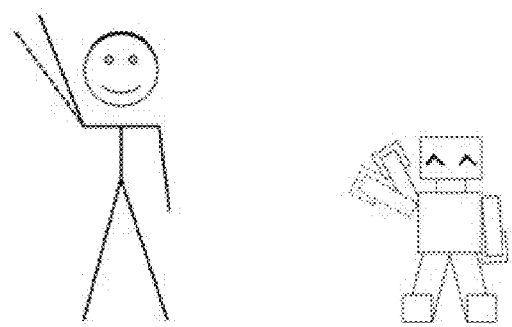

The robot is controlled according to the determined robot interaction output information to imitate the interaction output behavior of the trainer. In this way, the trainer can confirm that the robot accurately imitates the interaction behavior performed by the trainer (as shown in FIG. 1C).

Step 104: collect interaction trigger information corresponding to the robot interaction output information in response to an imitation termination instruction triggered when the imitation succeeds.

Figure 1D:
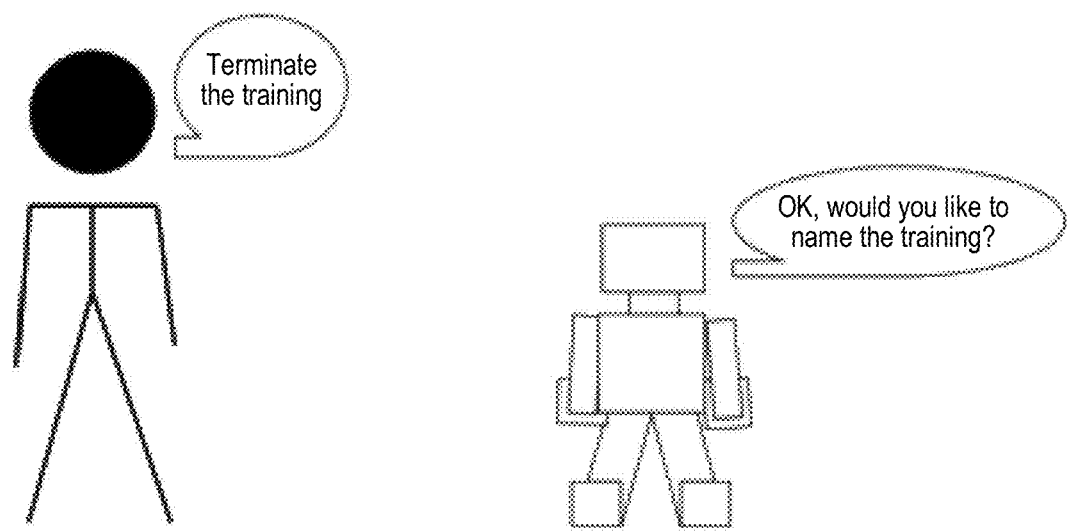

In some embodiments, when the robot imitates the interaction behavior of the trainer, the trainer triggers an imitation termination instruction. In one example, the imitation termination instruction is a specific voice instruction issued by the trainer, such as "terminate the training," as shown in FIG. 1D. When the robot receives the imitation termination instruction, the robot further collects the interaction trigger information corresponding to the obtained robot interaction output information, e.g., the input trigger information that triggers the robot to output the robot interaction output information in the subsequent actual use.

In some embodiments, after receiving the imitation termination instruction, the robot is controlled to issue a preset prompt voice to prompt the trainer to trigger the interaction trigger information, as shown in FIG. 1D.

Figure 1E:
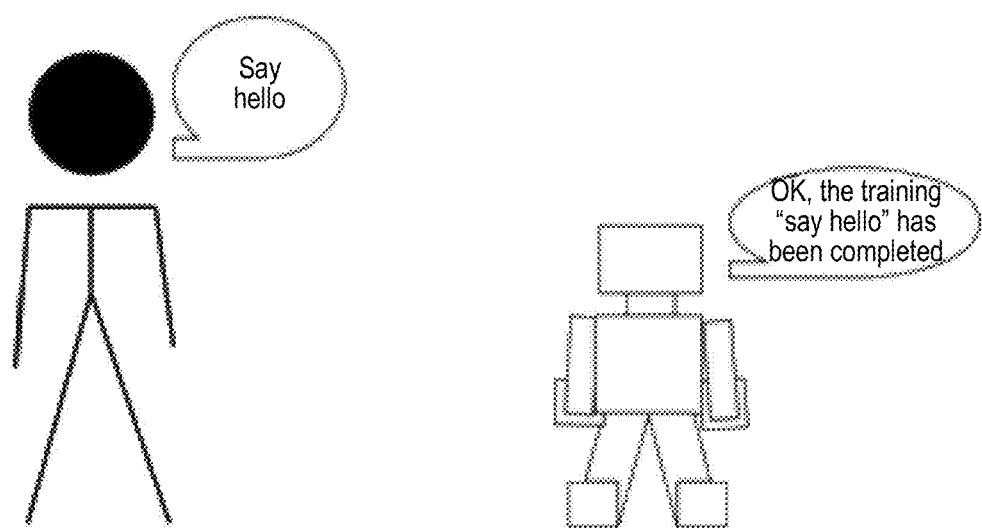

In one embodiment, the interaction trigger information includes a specific voice utterance, or a combination of a specific voice utterance and a specific motion, and the like. In one example, the specific voice utterance used as the interaction trigger information is "say hello" or "hi." As such, the collected specific voice utterance is used as the interaction trigger information, as shown in FIG. 1E.

In other embodiments, the interaction trigger information is specific text input from the trainer to the robot through an interface. In this case, in a subsequent scenario of interactions with the robot, if an interacting party produces a voice utterance corresponding to the specific text, the voice utterance is considered as matching the specific text, and the robot is then triggered to execute the corresponding robot interaction output information.

Step 105: store the interaction trigger information in relation to the robot interaction output information.

In some embodiments, the interaction trigger information directly collected and the above-described robot interaction output information already obtained is configured as an interaction rule, and correspondingly stored locally at the robot.

According to various embodiments, the robot learns automatically to obtain an interaction rule. In other words, the robot automatically collects the interaction trigger information, automatically learns the robot interaction output information by imitating the interaction output behavior of the trainer, thereby achieving simplicity and convenience in robot interactions. Moreover, robots trained by different people have different interaction rules based on different interaction habits, thus achieving multitudes of personalized interaction capabilities of robots.

In some embodiments, after one or a plurality of interaction rules are formed at a robot using the above-described embodiments, in actual use, the process of human-machine interaction is implemented as: collecting the to-be-processed interaction trigger information of an interacting party; and if the to-be-processed interaction trigger information matches an item of existing interaction trigger information, controlling the robot to execute the robot interaction output information corresponding to the interaction trigger information.

Figure 1F:
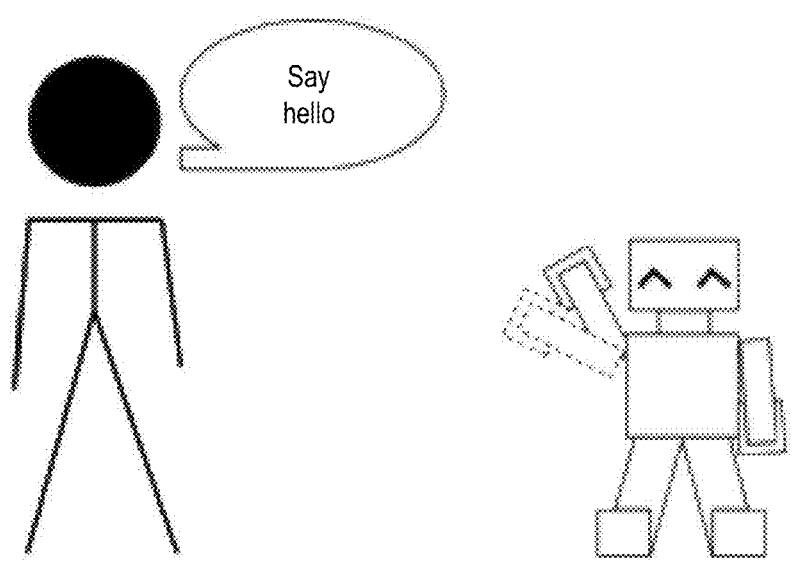

For example, when the to-be-processed interaction trigger information is a voice utterance of "say hello," and it is determined that the corresponding interaction trigger information already exists, the robot is controlled to execute the robot interaction output information corresponding to the determined interaction trigger information. As a result, the robot is controlled to lift its right hand, display a smile on its display, and produce a voice utterance of "hello," as shown in FIG. 1F.

In some embodiments, the interaction trigger information in relation to the robot interaction output information is stored locally at the robot. In other embodiments, the robot stores the interaction trigger information in relation to the robot interaction output information at a server, e.g., in a rule database corresponding to the robot at the server. In implementations, the robot sends a storage instruction to the server, which includes a robot identifier for the server to correspondingly stores the interaction trigger information in relation to the robot interaction output information in a corresponding database based on the robot identifier.

Figure 1G:
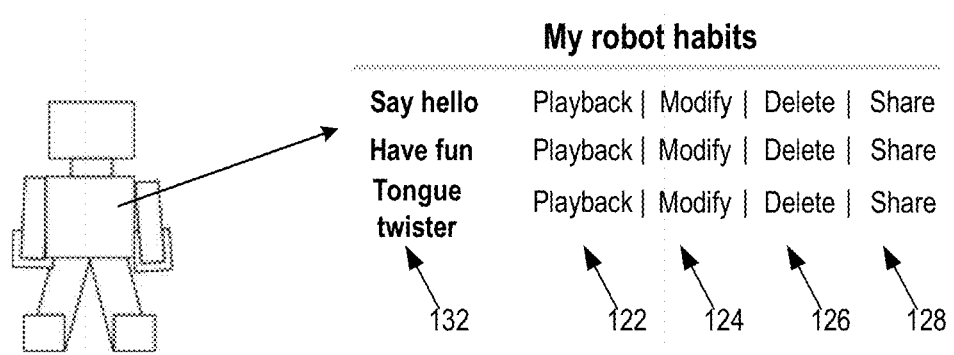
Figure 1H:
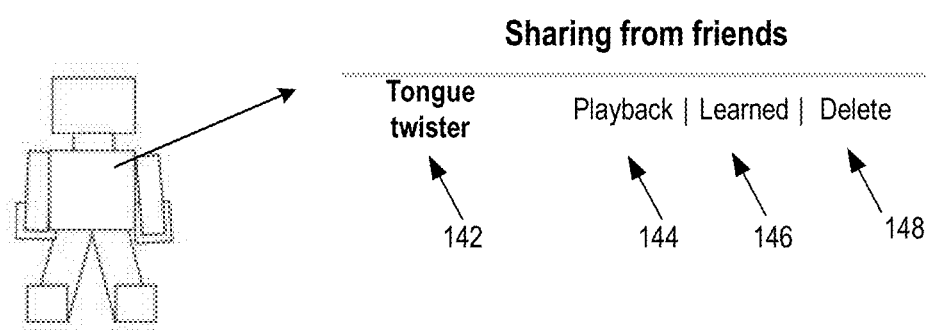

In some embodiments, after storing the interaction trigger information in relation to the robot interaction output information, the server generates an interaction option corresponding to the interaction trigger information. Further, the server updates the interaction option corresponding to the interaction trigger information to a client corresponding to the robot. In one embodiment, the interaction option includes an identifier item corresponding to the interaction trigger information, and various operation items. For example, as shown in FIG. 1G, if the interaction trigger information is a specific voice utterance, the corresponding identifier item (132) is set as text content corresponding to the specific voice utterance. In this example, operation items include operations to playback (122), delete (124), modify (126), share (128), etc.

In some embodiments, the client is located at a robot, or at a user device such as a mobile phone. Via the client, the user manages and uses the interaction rules learned by the robot.

In one example, the user clicks a playback operation item on the client to trigger a playback instruction. The client then sends the playback instruction to the robot. After the robot receives the playback instruction, the robot interaction output information that corresponds to the interaction trigger information is obtained from the server based on the interaction option, the interaction trigger information corresponding to the interaction option. Next, the robot is controlled to execute the robot interaction output information.

In another example, the user clicks a delete operation item at the client to trigger the deletion of the interaction trigger information corresponding to the interaction option and the robot interaction output information corresponding to the interaction trigger information from the server. In yet another example, the user clicks a modify operation at the client to trigger the process of relearning the robot interaction output information corresponding to the interaction trigger information.

In another example, the user clicks a sharing operation item at the client to trigger a sharing instruction, which includes a share-to object identifier. In some embodiments, the share-to object identifier is a friend identifier selected by the user from a friend list popped up after clicking the sharing operation item. After receiving the sharing instruction, the client sends, through the server, the interaction trigger information corresponding to the interaction option and the robot interaction output information corresponding to the interaction trigger information to another client corresponding to the share-to object identifier. In some embodiments, the server sends sharing prompt information to the other client corresponding to the share-to object identifier. In one embodiment, the sharing prompt information shown in FIG. 1H includes an identifier item corresponding to the interaction trigger information (142) and various operation items (144, 146, 148). For example, when the playback operation item (144) is clicked by the other client, the robot is triggered to execute the received robot interaction output information. When the delete operation item (148) is clicked, the received interaction trigger information and robot interaction output information is deleted. When the learned operation item (146) is clicked, the received interaction trigger information and robot interaction output information is stored in a rule database corresponding to the share-to object identifier at the server.

Using the above-described embodiments of the client, not only are human-machine interactions implemented at the client, but a learning result of a robot is also shared with other robots of the same type to facilitate the generation of interaction rules for other robots.

The apparatus for robot interactions according to some embodiments of the disclosure will be described in detail below. Those skilled in the art can understand that these apparatuses for robot interactions can be constructed through configuration by using commercially available hardware components through the steps taught in this solution.

Figure 2:
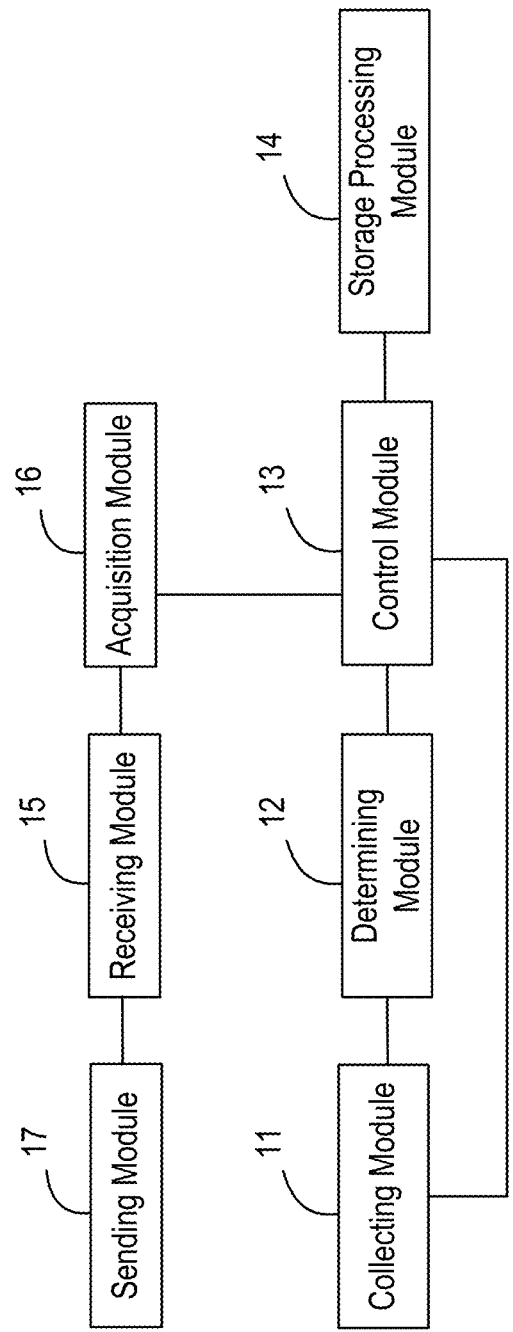
FIG. 2 is a block diagram illustrating an apparatus for robot interactions according to some embodiments of the disclosure.

FIG. 2 is a block diagram illustrating an apparatus for the robot interaction method of FIG. 1A according to some embodiments of the disclosure. As shown in FIG. 2, the apparatus includes a collecting module (11), a determining module (12), a control module (13), and a storage processing module (14).

The collecting module (11) is configured to collect the to-be-processed data reflecting an interaction output behavior.

The determining module (12) is configured to determine robot interaction output information corresponding to the to-be-processed data.

The control module (13) is configured to control a robot to execute the robot interaction output information to imitate the interaction output behavior.

In some embodiments, the collecting module (11) is further configured to collect the interaction trigger information corresponding to the robot interaction output information in response to an imitation termination instruction being triggered when the imitation succeeds.

The storage processing module (14) is configured to store the interaction trigger information in relation to the robot interaction output information.

In some embodiments, the to-be-processed data includes at least one of the following: a depth image, a color image, and an interactive voice utterance.

In some embodiments, if the to-be-processed data includes a color image, the determining module (12) is configured to perform facial expression recognition on the color image, and then determine an expression object corresponding to a recognized facial expression based on a preset expression library.

In some embodiments, if the to-be-processed data includes a depth image, the determining module (12) is configured to perform bone recognitions on the depth image to obtain the corresponding human joint posture information. In one embodiment, the determining module (12) is further configured to determine the robot joint posture information corresponding to the human joint posture information.

In some embodiments, the collecting module (11) is further configured to collect the to-be-processed interaction trigger information of an interacting party.

In some embodiments, the control module (13) is further configured to control the robot to execute the robot interaction output information, if it is determined that the to-be-processed interaction trigger information matches the interaction trigger information.

In some embodiments, the storage processing module (14) is specifically configured to store the interaction trigger information in relation to the robot interaction output information at a server, which updates an interaction option corresponding to the interaction trigger information to a client corresponding to the robot.

In some embodiments, the apparatus further includes a receiving module (15) and an acquisition module (16).

The receiving module (15) is configured to receive a playback instruction triggered according to the interaction option.

The acquisition module (16) is configured to obtain the robot interaction output information corresponding to the interaction trigger information from the server.

In some embodiments, the control module (13) is further configured to control the robot to execute the robot interaction output information.

In one embodiment, the receiving module (15) is further configured to receive a sharing instruction triggered according to the interaction option. In one example, the sharing instruction includes a share-to object identifier.

In some embodiments, the apparatus further includes a sending module (17) configured to send, by the server, the interaction trigger information and the robot interaction output information to a client corresponding to the share-to object identifier.

According to various embodiments, the apparatus of FIG. 2 is configured to perform the method of FIG. 1A. For the purpose of simplicity, details described above with reference to FIG. 1A are not repeated herein. Similarly, the execution processes and technical effects of the technical solution described above with reference to FIG. 1A are not repeated herein again.

Figure 3:
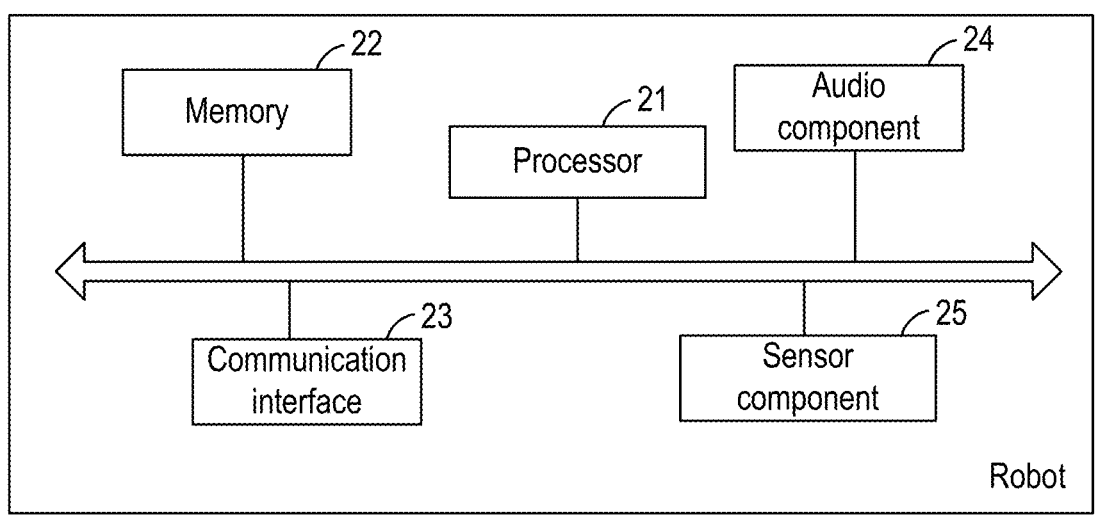
FIG. 3 is a block diagram illustrating an electronic device 2 according to some embodiments of the disclosure.

FIG. 3 is a block diagram illustrating an electronic device implementing the apparatus for robot interactions of FIG. 2, according to some embodiments of the disclosure. In one embodiment, the electronic device itself is a robot. In one example, as shown in FIG. 3, a robot includes a processor (21) and a memory (22). The memory (22) is configured to store a program that, when executed, instructs the robot to perform the method for robot interactions of FIG. 1A. The processor (21) is configured to execute the program stored in the memory (22).

The program includes one or a plurality of computer instructions, which, when executed by the processor (21), implement the following steps: collecting the to-be-processed data reflecting an interaction output behavior; determining the robot interaction output information corresponding to the to-be-processed data; controlling the robot to execute the robot interaction output information to imitate the interaction output behavior; collecting the interaction trigger information corresponding to the robot interaction output information in response to an imitation termination instruction triggered when the imitation succeeds; and storing the interaction trigger information in relation to the robot interaction output information.

In some embodiments, the processor (21) is further configured to perform all or part of the steps of the above-described method of FIG. 1A.

In one embodiment, the robot further includes a communication interface (23) configured for the robot to communicate with another device or a communication network. In one example, the robot communicates with a server at the communication interface (23).

In some embodiments, the robot further includes an audio component (24) and a sensor component (25).

The audio component (24) is configured to output and/or input an audio signal. In one embodiment, the audio component (24) includes a microphone (MIC). The microphone is configured to receive an external audio signal when the robot is in an operating mode (e.g., a voice recognition mode). The received audio signal is further stored in the memory (22), or sent via the communication interface (23). In some embodiments, the audio component (24) further includes a speaker configured to output audio signals.

The sensor component (25) includes one or a plurality of sensors. In one embodiment, the sensor component (25) includes a display of the robot. In another embodiment, the sensor component (25) is configured to detect the presence or absence of any contact between a user and the robot, and the like. In yet another embodiment, the sensor component (25) includes an optical sensor, such as a complementary metal-oxide-semiconductor (CMOS) or charge-coupled device (CCD) image sensor, for use in an imaging application. In some embodiments, the sensor component (25) further includes an acceleration sensor, a gyroscope sensor, a magnetic sensor, a pressure sensor, a temperature sensor, or the like.

According to various embodiments, the robot provided in the embodiment of the disclosure is configured with the flexibility of moving in a plurality of degrees of freedom.

Various embodiments of the disclosure also provide a computer storage medium configured to store computer software instructions used by a robot, the computer software instructions including a program for executing the method for robot interactions of FIG. 1A.

Figure 4A:
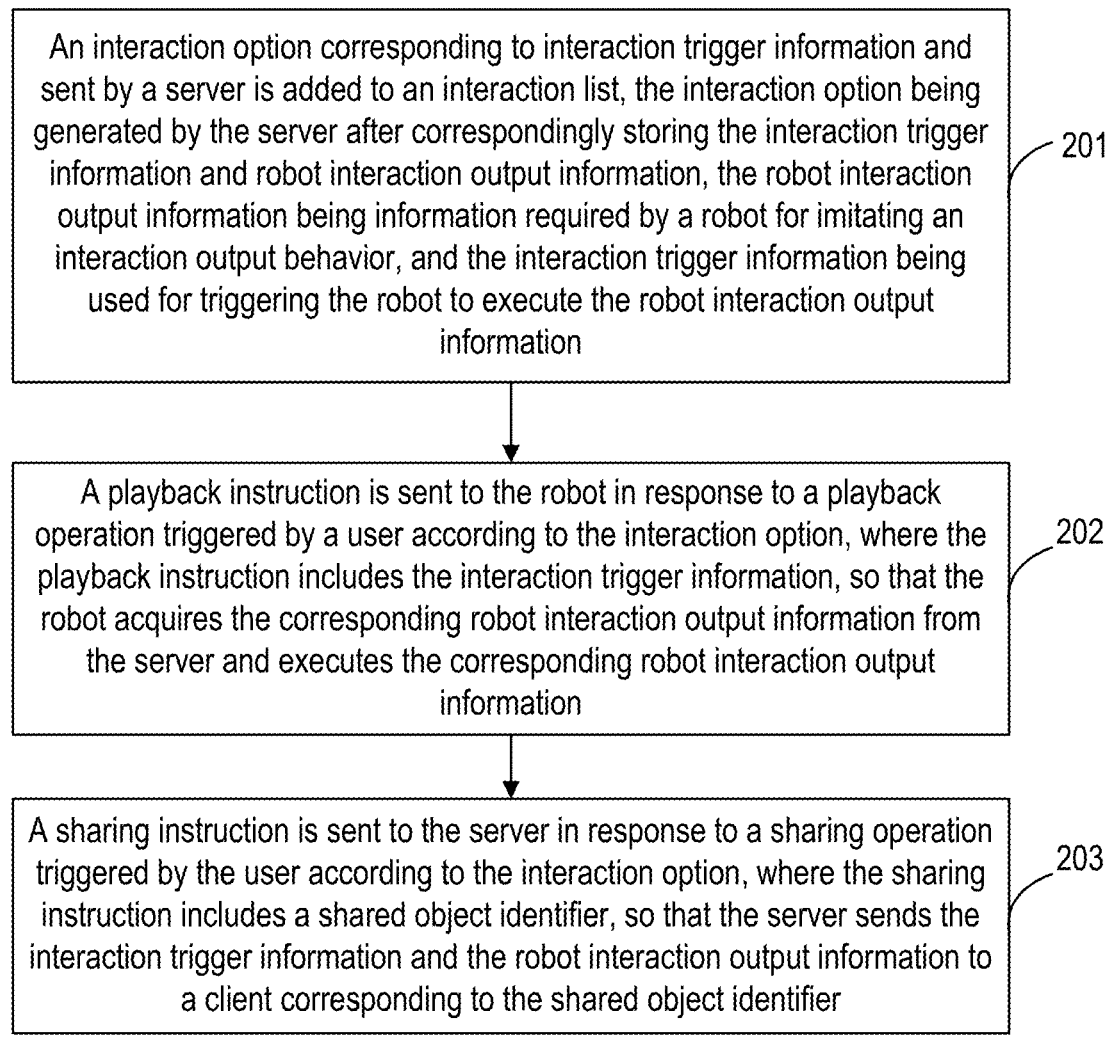
FIG. 4A is a flow diagram illustrating another method for robot interactions according to some embodiments of the disclosure.
Figure 4B:
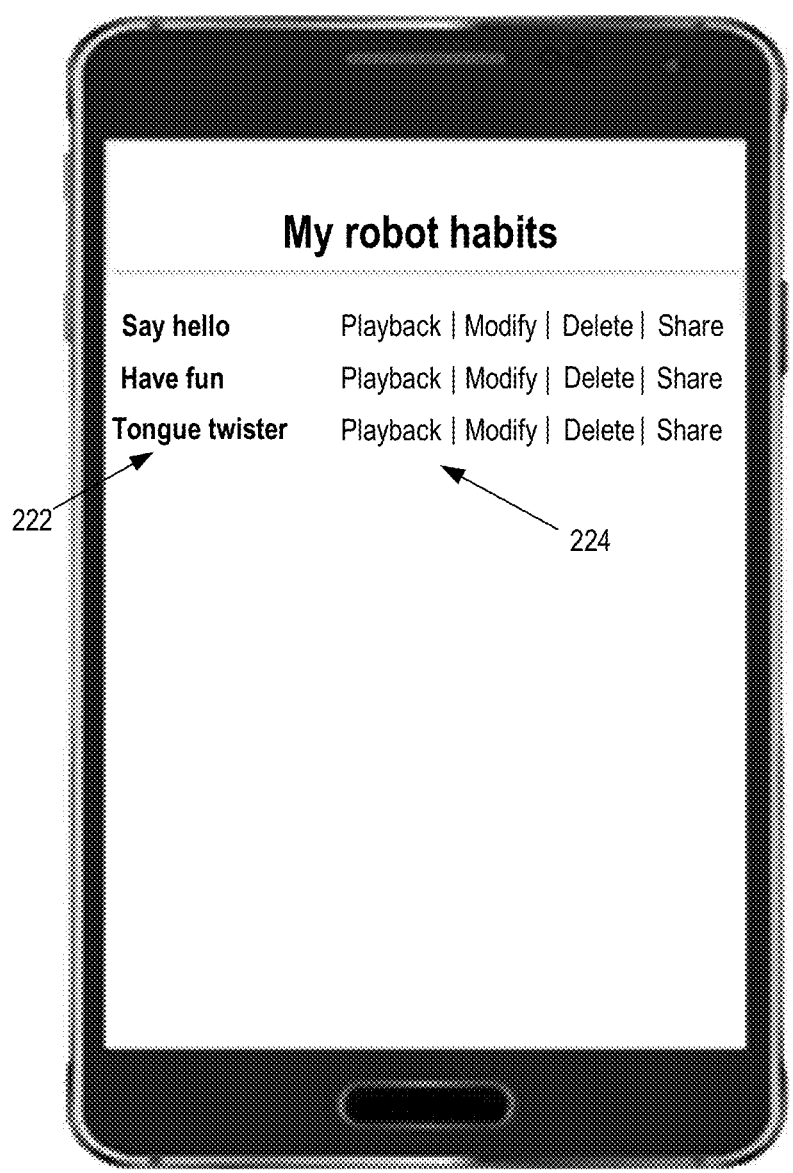
FIGS. 4B through 4C are diagrams illustrating client interface display effects according to some embodiments of the disclosure.
Figure 4C:

FIG. 4A is a flowchart of another method for robot interactions according to some embodiments of the disclosure. In some embodiments, the method for robot interactions is performed by an apparatus for robot interactions, which may be implemented as software, hardware, or as a combination thereof. In one embodiment, the apparatus for robot interactions is provided at a client. In another embodiment, the client is installed at a user device such as a smartphone. FIGS. 4B-4C are diagrams illustrating client interface display effects implementing the method of FIG. 4A according to some embodiments of the disclosure. The following describes the method of robot interactions with references to both FIG. 4A and FIGS. 4B-4C. As shown in FIG. 4A, the method of robot interaction includes the following steps.

Step 201: an interaction option corresponding to the interaction trigger information and sent by a server is added to an interaction list, the interaction option being generated by the server after storing the interaction trigger information in relation to the robot interaction output information. For example, the robot interaction output information includes the information required by a robot to imitate an interaction output behavior and the interaction trigger information is used for triggering the robot to execute the robot interaction output information.

As described previously, a robot learns robot interaction output information by imitating the interaction output behavior of a trainer. After collecting the interaction trigger information corresponding to the robot interaction output information, the interaction trigger information in relation to the robot interaction output information is stored at the server, for example, in a rule database corresponding to the robot at the server. The server further generates an interaction option corresponding to the interaction trigger information and sends the interaction option to a client corresponding to the robot. For illustration, the client is referred to as the "client a." In one example, as shown in FIG. 4B, the interaction option includes an identifier item (222) corresponding to the interaction trigger information and various operation items (224). When the interaction trigger information is a specific voice utterance, the corresponding identifier item (222) is text content corresponding to the specific voice utterance. The various operation items (224) include, for example, playback, delete, modify, share, etc. In this example, the interaction option that is sent to the "client a" corresponds to a tongue twister of FIG. 4B.

Step 202: a playback instruction is sent to the robot in response to a playback operation triggered by the user according to the interaction option. In one example, the playback instruction includes the interaction trigger information, based on which the robot obtains the corresponding robot interaction output information from the server and executes the corresponding robot interaction output information.

In one embodiment, when the "client a" is installed at a robot-independent user device such as a mobile phone, it is equivalent to human-machine interactive control being performed on the robot via the mobile phone. For example, when the user clicks a playback operation item corresponding to a tongue twister, the mobile phone sends a corresponding playback instruction to the robot, which in turn obtains the corresponding robot interaction output information from the server and executes the corresponding robot interaction output information to complete the interaction.

Step 203: a sharing instruction is sent to the server in response to a sharing operation triggered by the user according to the interaction option. In one example, the sharing instruction includes a share-to object identifier, and the server sends the interaction trigger information and the robot interaction output information to a client corresponding to the share-to object identifier.

In one embodiment, a result of "user a" training a robot thereof is shared with a "friend b" so that "friend b" having a robot of the same model can easily obtain an interaction rule of the robot.

In implementations, when "user a" triggers the sharing operation for the interaction option of a tongue twister at an interface of the "client a," the "client a" sends to the server a sharing instruction including a share-to object identifier, e.g., an identifier for "user b," and a to-be-shared interaction trigger information identifier, e.g., the "tongue twister". After receiving the sharing instruction, the server sends the interaction rule corresponding to the to-be-shared interaction trigger information identifier, e.g., the corresponding interaction trigger information in relation to the robot interaction output information to a "client b" corresponding to "user b." In some embodiments, as shown in FIG. 4C, the server sends sharing prompt information to the "client b" at the same time. This way, the server informs "user b" that a sharing message is received as well as related performable operations such that the received interaction rule is managed by user b Via the above-described embodiments of the client, both the controls of robot human-machine interactions and the sharing of an interaction rule is achieved.

Figure 5:
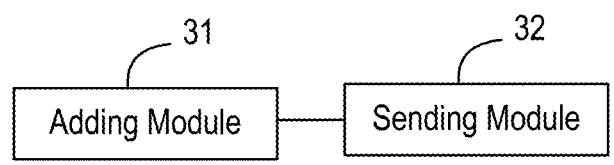
FIG. 5 is a block diagram illustrating an apparatus for robot interactions according to some embodiments of the disclosure.

FIG. 5 is a block diagram illustrating an apparatus for robot interactions corresponding to the method of FIG. 4A, according to some embodiments of the disclosure. As shown in FIG. 5, the apparatus includes an adding module (31) and a sending module (32).

The adding module (31) is configured to add, to an interaction list, an interaction option corresponding to the interaction trigger information and sent by a server. In one example, the interaction option is generated by the server after storing the interaction trigger information in relation to the robot interaction output information. In another example, the robot interaction output information includes the information required by a robot to imitate an interaction output behavior, and the interaction trigger information is used for triggering the robot to execute the robot interaction output information.

The sending module (32) is configured to send a playback instruction to the robot in response to a playback operation triggered by the user according to the interaction option. In one example, the playback instruction includes the interaction trigger information, based on which the robot obtains the robot interaction output information from the server and executes the robot interaction output information.

In some embodiments, the sending module (32) is further configured to send a sharing instruction to the server in response to a sharing operation triggered by the user according to the interaction option. In one example, the sharing instruction includes a share-to object identifier such that the server sends the interaction trigger information and the robot interaction output information to a client corresponding to the share-to object identifier.

According to various embodiments, the apparatus of FIG. 5 performs the method in the embodiments of FIG. 4A. For simplicity, details described above in the description of FIG. 4A are not repeated. Similarly, the execution processes and technical effects of the technical solution described in the description of FIG. 4A and are not repeated.

Figure 6:
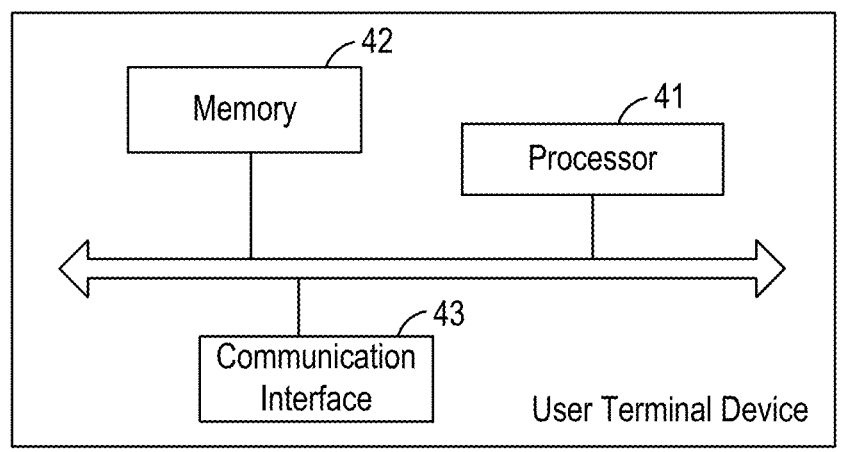
FIG. 6 is a block diagram illustrating an electronic device according to some embodiments of the disclosure.

FIG. 6 is a block diagram illustrating an electronic device implementing the apparatus for robot interactions of FIG. 5, according to some embodiments of the disclosure. In one embodiment, the electronic device is a user device such as a smartphone. In one example, as shown in FIG. 6, the user device includes a processor (41) and a memory (42). The memory (42) is configured to store a program that, when executed, instructs the user device to perform the method for robot interactions provided in the embodiments of FIG. 4A. The processor (41) is configured to execute the program stored in the memory (42).

The program includes one or a plurality of computer instructions, which, when executed by the processor (41), implement the following steps.

Step 1: adding, to an interaction list, an interaction option corresponding to the interaction trigger information and sent by a server. In one example, the interaction option is generated by the server after storing the interaction trigger information in relation to the robot interaction output information. In another example, the robot interaction output information includes the information required by a robot to imitate an interaction output behavior, and the interaction trigger information is used for triggering the robot to execute the robot interaction output information;

Step 2: sending a playback instruction to the robot in response to a playback operation triggered by a user according to the interaction option. In one example, the playback instruction includes the interaction trigger information, based on which the robot obtains the robot interaction output information from the server and executes the robot interaction output information.

In some embodiments, the processor (41) is further configured to perform all or part of the steps of the preceding method of FIG. 4A.

In some embodiments, the user device further includes a communication interface (43) configured for the user device to communicate with another device or a communication network.

In some embodiments, an embodiment of the disclosure provides a computer storage medium configured to store computer software instructions used by a user device, the software instructions including a program for performing the method for robot interactions in the above-described method of FIG. 4A.

Figure 7:
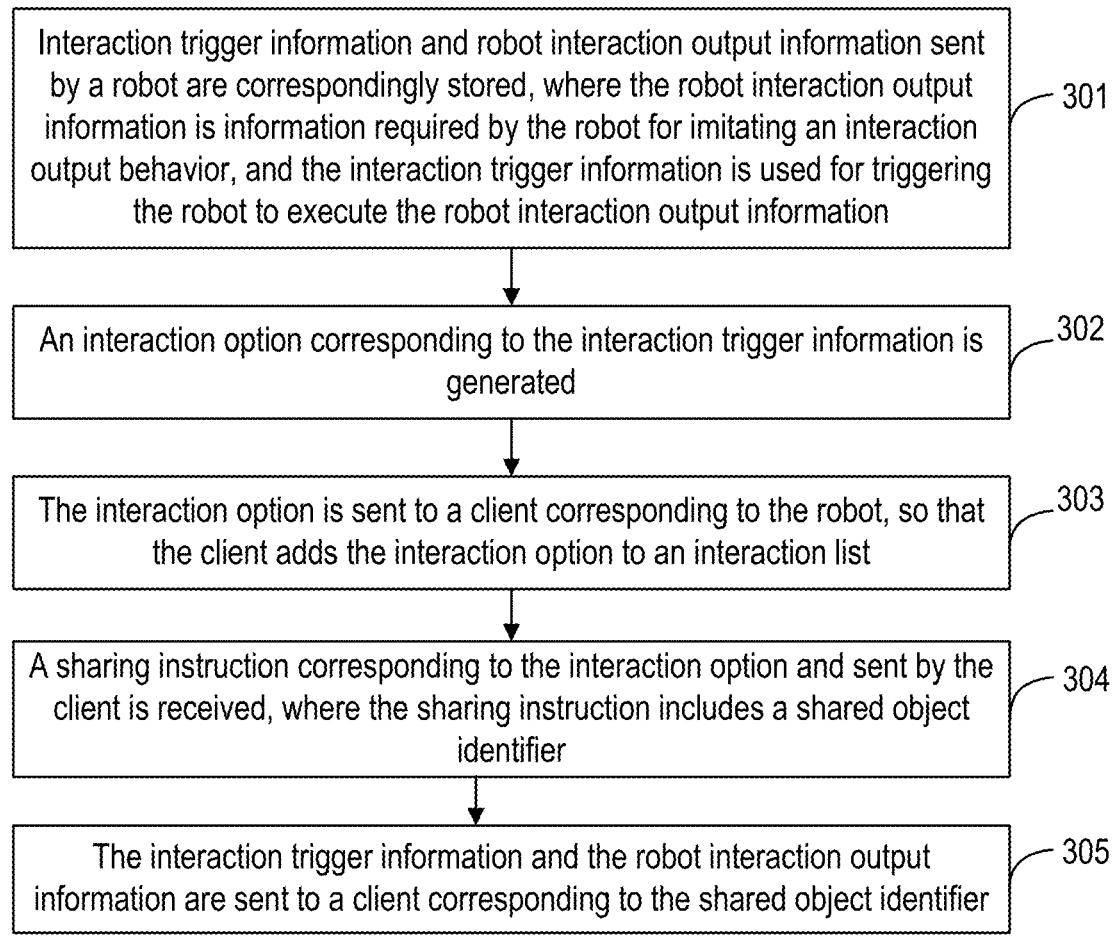
FIG. 7 is a flow diagram illustrating still another method for robot interactions according to some embodiments of the disclosure.

FIG. 7 is a flow chart illustrating a method for robot interactions according to embodiments of the disclosure. In some embodiments, the method for robot interactions is performed by an apparatus for robot interactions. In one embodiment, the apparatus is implemented as software, hardware, or as a combination thereof. In one embodiment, the apparatus for robot interactions is provided at a server. In one example, as shown in FIG. 7, the method includes the following steps.

Step 301: interaction trigger information in relation to robot interaction output information sent by a robot is stored. In one example, the robot interaction output information includes information required by the robot for imitating an interaction output behavior, and the interaction trigger information is used for triggering the robot to execute the robot interaction output information.

Step 302: an interaction option corresponding to the interaction trigger information is generated.

Step 303: the interaction option is sent to a client corresponding to the robot such that the client adds the interaction option to an interaction list.

As previously described, a robot learns robot interaction output information by imitating the interaction output behavior of a trainer. After collecting the interaction trigger information corresponding to the robot interaction output information, the interaction trigger information and the robot interaction output information is sent to the server, which stores the interaction trigger information in relation to the robot interaction output information in a rule database corresponding to the robot. The server further generates an interaction option corresponding to the interaction trigger information. The server sends the interaction option to the client corresponding to the robot. The client is referred to as the "client a." In one example, the interaction options include operation items such as share and playback.

Step 304: a sharing instruction corresponding to the interaction option and sent by the client is received. In one example, the sharing instruction includes a share-to object identifier.

Step 305: the interaction trigger information and the robot interaction output information is sent to a client corresponding to the share-to object identifier.

In implementations, when a user triggers a sharing operation for an interaction option at an interface of "client a,"

"client a" sends to the server a sharing instruction including a share-to object identifier, e.g., an identifier of a "user b," and a to-be-shared interaction trigger information identifier (e.g., a tongue twister). After receiving the sharing instruction, the server sends an interaction rule corresponding to the to-be-shared interaction trigger information identifier, e.g., the corresponding interaction trigger information and robot interaction output information to a "client b" corresponding to the "user b." In some embodiments, the server sends sharing prompt information to the "client b" at the same time to inform the "user b" of specific operations that can be performed on the received interaction rule.

Figure 8:
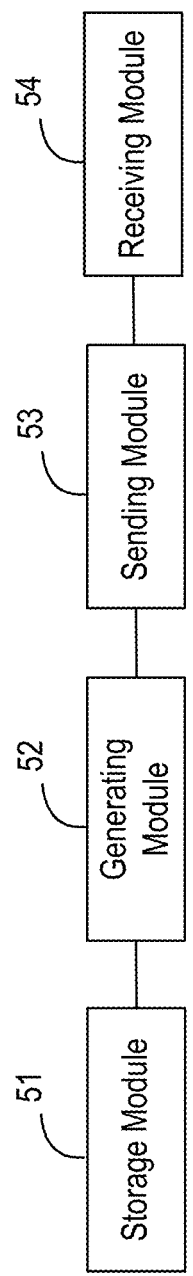
FIG. 8 is a block diagram illustrating an apparatus for robot interactions according to some embodiments of the disclosure.

FIG. 8 is a block diagram of an apparatus for robot interactions corresponding to the method of FIG. 7. As shown in FIG. 8, the apparatus includes a storage module (51), a generating module (52), and a sending module (53).

The storage module (51) is configured to store interaction trigger information in relation to robot interaction output information sent by a robot. In one example, the robot interaction output information includes the information required by the robot for imitating an interaction output behavior, and the interaction trigger information is used for triggering the robot to execute the robot interaction output information.

The generating module (52) is configured to generate an interaction option corresponding to the interaction trigger information.

The sending module (53) is configured to send the interaction option to a client corresponding to the robot such that the client adds the interaction option to an interaction list.

In some embodiments, the apparatus further includes a receiving module (54).

The receiving module (54) is configured to receive a sharing instruction corresponding to the interaction option and sent by the client. In one example, the sharing instruction includes a share-to object identifier.

Correspondingly, the sending module (53) is further configured to send the interaction trigger information and the robot interaction output information to a client corresponding to the share-to object identifier.

According to various embodiments, the apparatus of FIG. 8 performs the method of FIG. 7. For simplicity, details described above in the description of FIG. 7 are not repeated herein. Similarly, the execution processes and technical effects of the technical solution described above in the description of FIG. 7 are not repeated herein.

Figure 9:
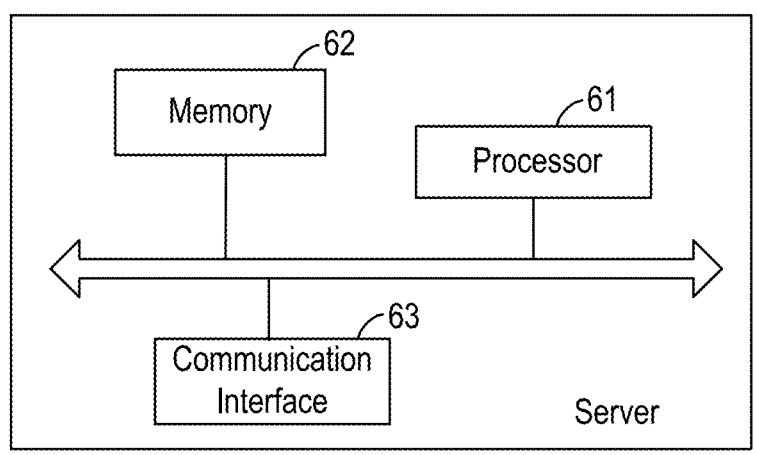
FIG. 9 is a block diagram illustrating an electronic device according to some embodiments of the disclosure.

FIG. 9 is a block diagram illustrating an electronic device implementing the apparatus of FIG. 8, according to some embodiments of the disclosure. In some embodiments, the electronic device is a server. In one embodiment, as shown in FIG. 9, the server includes a processor (61) and a memory (62). The memory (62) is configured to store a program that, when executed, instructs the server to perform the method for robot interactions provided in the embodiments of FIG. 7. The processor (61) is configured to execute the program stored in the memory (62).

The program includes one or a plurality of computer instructions, which, when executed by the processor (61), implements the following steps.

Step 1: correspondingly storing interaction trigger information and robot interaction output information sent by a robot. In one example, the robot interaction output information includes the information required by the robot for imitating an interaction output behavior, and the interaction trigger information is used for triggering the robot to execute the robot interaction output information;

Step 2: generating an interaction option corresponding to the interaction trigger information;

Step 3: sending the interaction option to a client corresponding to the robot such that the client adds the interaction option to an interaction list.

In some embodiments, the processor (61) is further configured to perform all or part of the steps of the foregoing method of FIG. 7.

In some embodiments, the server further includes a communication interface (63) configured for the server to communicate with another device or a communication network.

In some embodiments, an embodiment of the disclosure provides a computer storage medium configured to store computer software instructions used by a server and the software instructions including a program for performing the method for robot interactions in the above-described method of FIG. 7.

Figure 10B:
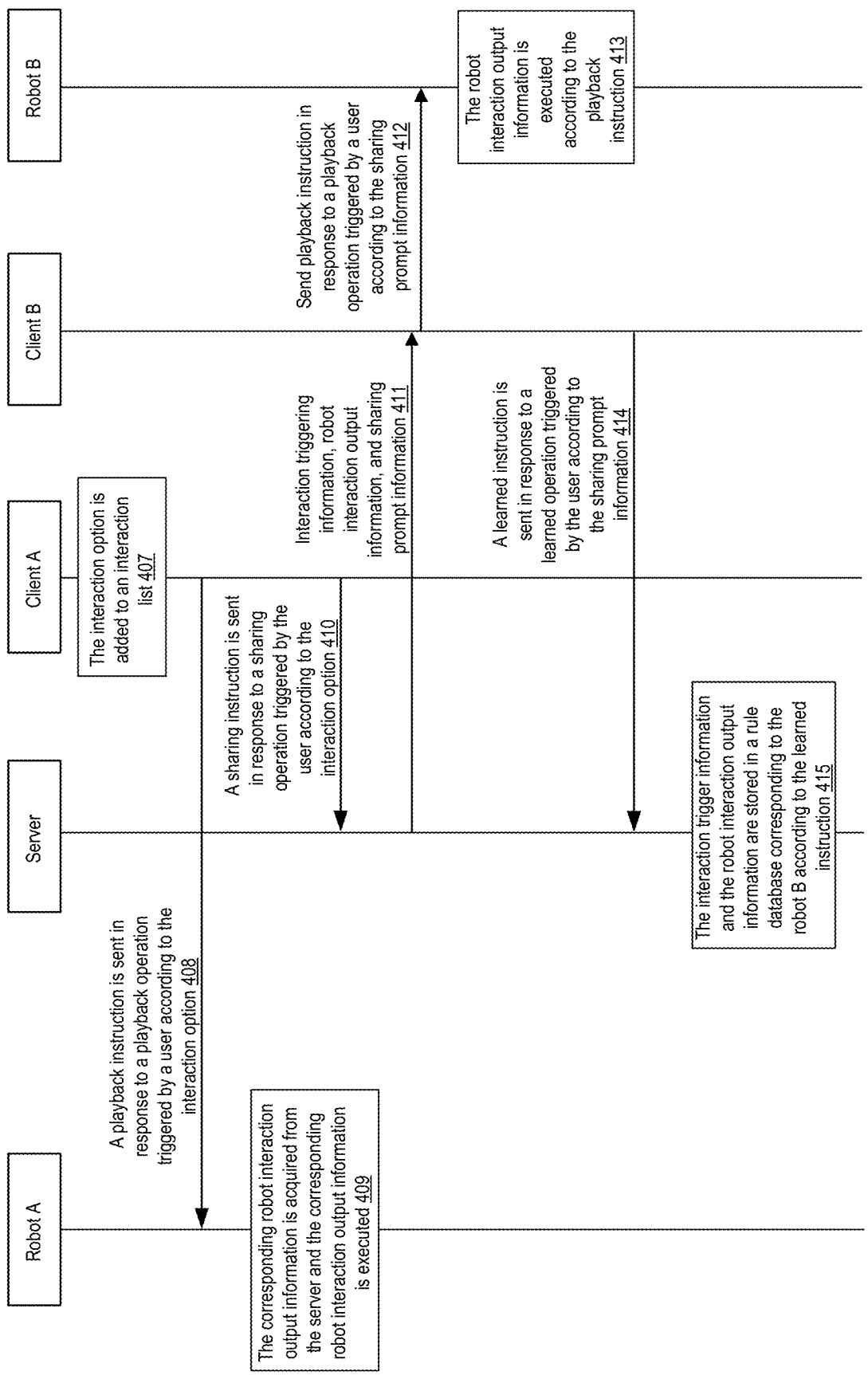

FIGS. 10A and 10B are interaction flow diagrams illustrating a method for robot interactions according to an embodiment of the disclosure. In this embodiment, as shown in FIGS. 10A and 10B, the method includes the following steps.

Step 401: in response to an instruction to start imitation, a "robot A" collects to-be-processed data reflecting an interaction output behavior.

Step: 402: the "robot A" determines the robot interaction output information corresponding to the to-be-processed data, and executes the robot interaction output information to imitate the interaction output behavior.

Step 403: the "robot A" collects interaction trigger information corresponding to the robot interaction output information in response to an imitation termination instruction triggered when the imitation succeeds.

Step 404: the "robot A" sends the interaction trigger information in relation to the robot interaction output information to a server.

Step 405: the server stores the interaction trigger information in relation to the robot interaction output information in a rule database corresponding to the "robot A," and generates an interaction option corresponding to the interaction trigger information.

Step 406: the server sends the interaction option to a "client a" corresponding to the "robot A."

Step 407: the "client a" adds the interaction option to an interaction list. Step 407 is reproduced in both FIGS. 10A and 10B solely to illustrate the continuity between the diagrams.

Step 408: the "client a" sends a playback instruction to the "robot A" in response to a playback operation triggered by a user according to the interaction option.

Step 409: the "robot A" obtains the corresponding robot interaction output information from the server and executes the corresponding robot interaction output information.

Step 410: the "client a" sends a sharing instruction to the server in response to a sharing operation triggered by the user according to the interaction option, where the sharing instruction includes a share-to object identifier.

Step 411: the server sends the interaction trigger information corresponding to the interaction option, the robot interaction output information, and sharing prompt information to a "client b" corresponding to the share-to object identifier.

Step 412: the "client b" sends a playback instruction to a "robot B" in response to a playback operation triggered by the user according to the sharing prompt information, where the playback instruction includes the robot interaction output information.

Step 413: the "robot B" executes the robot interaction output information according to the playback instruction.

Step 414: the "client b" sends a learned instruction to the server in response to a learned operation triggered by the user according to the sharing prompt information.

Step 415. the server stores the interaction trigger information in relation to the robot interaction output information in a rule database corresponding to the "robot B" according to the learned instruction.

In this example, the user triggering limited operation items at the "client a" and the "client b" is illustrated. Operations on other operation items are similar to the above-described embodiments and are not repeated herein.

Figure 11:
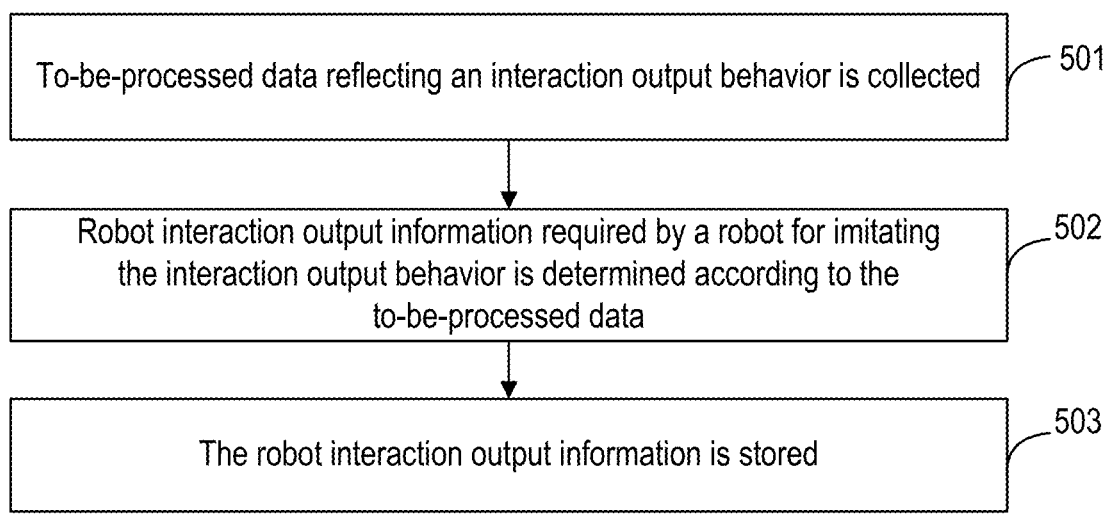
FIG. 11 is a flow diagram illustrating a method for robot interactions according to some embodiments of the disclosure.

FIG. 11 is a flow chart of a method for robot interactions according to embodiments of the disclosure. In some embodiments, the method for robot interactions is performed by an apparatus for robot interactions. In some embodiments, the apparatus is implemented as software, hardware, or as a combination thereof. In one embodiment, the apparatus for robot interactions is provided at a robot. In one example, as shown in FIG. 11, the method for robot interactions includes the following steps.

Step 501: to-be-processed data reflecting an interaction output behavior is collected.

Step 502: robot interaction output information required by a robot for imitating the interaction output behavior is determined according to the to-be-processed data.

Step 503: robot interaction output information is stored.

In one embodiment, the robot obtains, by automatic learning, the robot interaction output information used as an output response such that, in practical applications, the robot performs various interactions with the user.

According to various embodiments, the method for obtaining the robot output response is by learning the interaction output behavior. In one example, the interaction output behavior is triggered by a trainer facing the robot. In this case, the to-be-processed data reflecting the interaction output behavior includes sensory data, such as a depth image, a color image, a voice, and other data collected by various collecting apparatuses installed at the body of the robot. In some embodiments, the to-be-processed data is pre-generated audio and a video image including an interaction output behavior.

The process of determining the robot interaction output information required by the robot for imitating the interaction output behavior according to the to-be-processed data is substantially similar to those above-described embodiments of FIG. 1A, the details of which are repeated herein.

In some embodiments, after the robot interaction output information causing the robot to imitate the interaction output behavior is determined, the robot is controlled to execute the robot interaction output information to imitate the interaction output behavior. This way, when a trainer determines that the imitation performed by the robot succeeds, the robot is instructed to store the robot interaction output information locally or at a server.

In some embodiments, in a scenario of human-machine interactions, an interacting party inputs different items of interaction trigger information to the robot, triggering the robot to exhibit different interaction effects. As such, the interaction trigger information often corresponds to the robot interaction output information. After the robot has obtained the robot interaction output information through automatic learning, the interaction trigger information is set to correspond to the robot interaction output information, thereby generating an interaction rule for a practical human-machine interaction application.

In some embodiments, after the above-described robot interaction output information is obtained, the interaction trigger information corresponding to the robot interaction output information is obtained such that the interaction trigger information in relation to the robot interaction output information is stored to generate an interaction rule.

In some embodiments, the above-described interaction trigger information is manually configured by the trainer. For example, the interaction trigger information corresponding to the robot interaction output information can be written in a configuration interface. The interaction trigger information can be, for example, a physical button or an icon control being operated upon, a sentence, an expression, external environmental conditions, and so on.

In some embodiments, the interaction trigger information is similar to the robot interaction output information in that, the interaction trigger information is also obtained by the robot by capturing the behavior of a trainer. For example, in a practical application, when a robot succeeds in imitating an interaction output behavior of the trainer, the trainer may issue an instruction to end the learning. In response to the instruction, the robot vocally queries the trainer to ask him/her to set the interaction trigger information for the learned robot interaction output information. for example, the robot can say "Please name the interaction habit learned just now." Here, the name is to correspond to the interaction trigger information. The trainer thus performs an interaction triggering behavior corresponding to the interaction trigger information. The behavior may be, for example, saying a trigger sentence, performing a movement, and the like. The robot collects the audio including the sentence from the trainer, collects an image including the movement, such that the audio and the image is directly stored as interaction trigger information. This way, in a subsequent practical application, if the collected audio and movement images triggered by an interacting party match with the stored audio and images in respective features, the robot executes the corresponding robot interaction output information.

Figure 12:
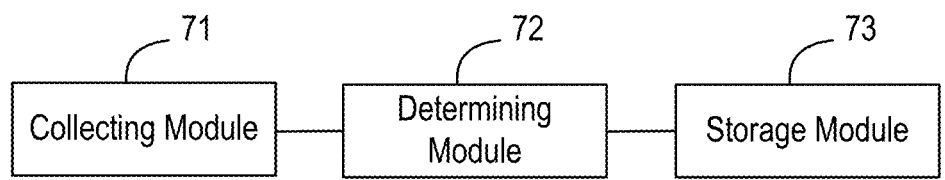
FIG. 12 is a block diagram illustrating an apparatus for robot interactions according to some embodiments of the disclosure.

FIG. 12 is a block diagram of an apparatus for robot interactions corresponding to the method of FIG. 11. As shown in FIG. 12, the apparatus includes a collecting module (71), a determining module (72), and a storage module (73).

The collecting module (71) is configured to collect to-be-processed data reflecting an interaction output behavior.

The determining module (72) is configured to determine, according to the to-be-processed data, the robot interaction output information required by a robot for imitating the interaction output behavior.

The storage module (73) is configured to store the robot interaction output information.

In some embodiments, the collecting module (71) is further configured to collect the interaction trigger information corresponding to the robot interaction output information.

Correspondingly, the storage module (73) is further configured to store the interaction trigger information in relation to the robot interaction output information.

According to various embodiments, the apparatus of FIG. 12 performs the method of the embodiments of FIG. 11. For simplicity, details described above in the description of FIG. 11 are not repeated herein. Similarly, the execution processes and technical effects of the technical solution described above in the description of FIG. 11 are not repeated herein.

Figure 13:
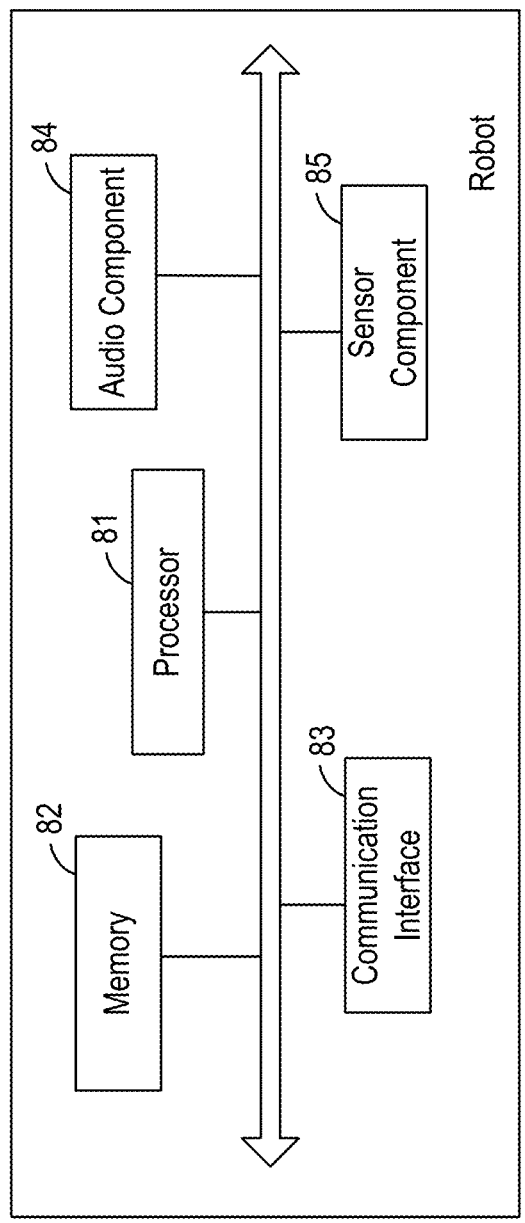
FIG. 13 is a block diagram of an electronic device implementing the apparatus for robot interactions according to some embodiments of the disclosure.

FIG. 13 is a block diagram illustrating an electronic device for robot interactions implementing the apparatus for robot interactions shown in FIG. 12, according to some embodiments of the disclosure. In some embodiments, the electronic device is a robot. In one embodiment, as shown in FIG. 13, the robot includes a processor (81) and a memory (82). The memory (82) is configured to store a program that, when executed, instructs the robot to perform the method for robot interactions provided in the above-described embodiments of FIG. 11. The processor (81) is configured to execute the program stored in the memory (82).

The program includes one or a plurality of computer instructions, which when executed by the processor (81), implements the following steps: collecting to-be-processed data reflecting an interaction output behavior; determining, according to the to-be-processed data, robot interaction output information required by a robot for imitating the interaction output behavior; and storing the robot interaction output information.

In some embodiments, the processor (81) is further configured to perform all or part of steps of the method of FIG. 11.

In some embodiments, the robot further includes a communication interface (83) configured for the robot to communicate with another device or a communication network.

In some embodiments, the robot further includes an audio component (84) and a sensor component (85).

The audio component (84) is configured to output and/or input an audio signal. For example, the audio component (84) includes a microphone (MIC). The microphone is configured to receive external audio signals when the robot is in an operating mode (e.g., a voice recognition mode). In one example, the received audio signal is further stored in the memory (82) or sent via the communication interface (83). In some embodiments, the audio component (84) further includes a speaker configured to output audio signals.

The sensor component (85) includes one or a plurality of sensors. For example, the sensor component (85) includes a display of the robot. For another example, the sensor component (85) further detects the presence or absence of any contact between a user and the robot, and the like. In other examples, the sensor component (85) includes an optical sensor, such as a CMOS or CCD image sensor, for use in an imaging application. In some embodiments, the sensor component (85) further includes an acceleration sensor, a gyroscope sensor, a magnetic sensor, a pressure sensor, a temperature sensor, or the like.

Some embodiments of the disclosure provide a computer storage medium configured to store computer software instructions used by a robot, the software instructions including a program involved for performing the method for robot interactions in the above method embodiments of FIG. 11.

The apparatus embodiments described above are only schematic. The units described as separate components may or may not be physically separated, and the components displayed as units may or may not be physical units, that is, may be located at the same place, or may be distributed in a plurality of network units. The objective of the solution of this embodiment may be implemented by selecting a part of or all the modules according to actual requirements. Those of ordinary skill in the art could understand and implement the disclosure without creative efforts.

Through the preceding description of the embodiments, those skilled in the art can clearly understand that the implementation manners can be implemented by software plus a necessary general hardware platform, and certainly can also be implemented by a combination of hardware and software. Based on such understanding, the above technical solution essentially or the portion contributing to current systems may be embodied in the form of a computer product. The disclosure may adopt the form of a computer program product implemented on one or a plurality of computer-usable storage media (including but not limited to a magnetic disk storage, a CD-ROM, an optical storage, etc.) containing computer-usable program code therein.

The disclosure is described with reference to flowcharts and/or block diagrams of a method, a device (system), and a computer program product according to the embodiments of the disclosure. It should be understood that each procedure and/or block in the flowcharts and/or block diagrams, and a combination of procedures and/or blocks in the flowcharts and/or block diagrams may be implemented with computer program instructions. These computer program instructions may be provided to a processor of a general-purpose computer, a special-purpose computer, an embedded processor, or any other programmable data processing device to produce a machine, so that instructions executed by the processor of the computer or other programmable data processing device generate means for implementing a specified function in one or a plurality of procedures in the flowcharts and/or one or a plurality of blocks in the block diagrams.

These computer program instructions may also be stored in a computer-readable memory that can direct a computer or any other programmable data processing device to operate in a particular manner, such that the instructions stored in the computer-readable memory produce an article of manufacture including instruction means, the instruction means implementing a specified function in one or a plurality of procedures in the flowcharts and/or one or a plurality of blocks in the block diagrams.

These computer program instructions may also be loaded onto a computer or any other programmable data processing device so that a series of operational steps are performed on the computer or other programmable device to produce computer-implemented processing, and thus the instructions executed on the computer or other programmable device provide the steps for implementing a specified function in one or a plurality of procedures in the flowcharts and/or one or a plurality of blocks in the block diagrams.

In a typical configuration, the computing device includes one or a plurality of processors (CPUs), input/output interfaces, network interfaces, and memories.

The memory may include a computer-readable medium in the form of a non-permanent memory, a random-access memory (RAM) and/or non-volatile memory or the like, such as a read-only memory (ROM) or a flash memory (flash RAM). The memory is an example of a computer-readable medium.

The computer readable medium includes permanent and non-permanent, movable, and non-movable media that can achieve information storage by means of any methods or techniques. The information may be computer readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer readable medium does not include transitory computer readable media (transitory media), such as a modulated data signal and a carrier wave.

It should be finally noted that the above embodiments are merely used for illustrating rather than limiting the technical solutions of the disclosure. Although the disclosure is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the spirit and scope of the technical solutions in the embodiments of the disclosure.

What is claimed is:

1. A method comprising:
    recording data reflecting an interaction output behavior of a user;
    determining robot interaction output information corresponding to the data;
    controlling a robot to execute the robot interaction output information, the controlling causing the robot to imitate the interaction output behavior;
    detecting an imitation termination instruction, the imitation termination instruction comprising a verbal command issued by the user;
    prompting, in response to the imitation termination instruction, the user to provide interaction trigger information corresponding to the robot interaction output information, the interaction trigger information comprising one or more of a voice utterance and a specific motion performed by the user;
    associating the interaction trigger information with the robot interaction output information;
    storing the interaction trigger information and the robot interaction output information; and
    performing the robot interaction output information in response to detecting the interaction trigger information.

2. The method of claim 1, further comprising:
    collecting second interaction trigger information of an interacting party; and
    controlling the robot to execute the robot interaction output information when the second interaction trigger information matches the interaction trigger information.

3. The method of claim 1, the data comprising data selected from the group consisting of a depth image, a color image, and an interactive voice utterance.

4. The method of claim 3, the determining robot interaction output information corresponding to the data comprising:
    performing facial expression recognition on a color image;
    determining an expression object corresponding to a recognized facial expression from a preset expression library; and
    setting the robot interaction output information to the expression object.

5. The method of claim 3, the determining robot interaction output information corresponding to the data comprising:
    performing bone recognition on a depth image to obtain human joint posture information;
    determining robot joint posture information corresponding to the human joint posture information; and
    setting the robot interaction output information to the robot joint posture information.

6. The method of claim 1, the storing the interaction trigger information in relation to the robot interaction output information comprising:
    storing the interaction trigger information and the robot interaction output information at a server, the server transmitting an interaction option corresponding to the interaction trigger information to a client corresponding to the robot.

7. The method of claim 6, further comprising:
    receiving a playback instruction triggered based on the interaction option;
    obtaining the robot interaction output information corresponding to the interaction trigger information from the server; and
    controlling the robot to execute the robot interaction output information.

8. The method of claim 6, further comprising:
    receiving a sharing instruction triggered based on the interaction option, the sharing instruction comprising an object identifier; and
    sending, by the server, the interaction trigger information in relation to the robot interaction output information to a client corresponding to the object identifier.

9. The method of claim 1, the storing the interaction trigger information and the robot interaction output information comprising generating an interaction rule.

10. A non-transitory computer-readable storage medium for tangibly storing computer program instructions capable of being executed by a computer processor, the computer program instructions defining the steps of:
    recording data reflecting an interaction output behavior of a user;
    determining robot interaction output information corresponding to the data;
    controlling a robot to execute the robot interaction output information, the controlling causing the robot to imitate the interaction output behavior;
    detecting an imitation termination instruction, the imitation termination instruction comprising a verbal command issued by the user;
    prompting, in response to the imitation termination instruction, the user to provide interaction trigger information corresponding to the robot interaction output information, the interaction trigger information comprising one or more of a voice utterance and a specific motion performed by the user to cause the robot to execute the robot interaction output information;
    associating the interaction trigger information with the robot interaction output information;
    storing the interaction trigger information and the robot interaction output information; and
    performing the robot interaction output information in response to detecting the interaction trigger information.

11. The computer-readable storage medium of claim 10, further comprising:
    collecting second interaction trigger information of an interacting party; and controlling the robot to execute the robot interaction output information when the second interaction trigger information matches the interaction trigger information.

12. The computer-readable storage medium of claim 11, the determining robot interaction output information corresponding to the data comprising:
    performing facial expression recognition on a color image;
    determining an expression object corresponding to a recognized facial expression from a preset expression library; and
    setting the robot interaction output information to the expression object.

13. The computer-readable storage medium of claim 11, the determining robot interaction output information corresponding to the data comprising:
    performing bone recognition on a depth image to obtain human joint posture information;
    determining robot joint posture information corresponding to the human joint posture information; and
    setting the robot interaction output information to the robot joint posture information.

14. The computer-readable storage medium of claim 10, further comprising:
    receiving a playback instruction triggered based on an interaction option;
    obtaining the robot interaction output information corresponding to the interaction trigger information from a server; and
    controlling the robot to execute the robot interaction output information.

15. The computer-readable storage medium of claim 10, the storing the interaction trigger information and the robot interaction output information comprising generating an interaction rule.

16. An apparatus comprising:
    a processor; and
    a storage medium for tangibly storing thereon program logic for execution by the processor, the stored program logic comprising:
    logic, executed by the processor, for recording data reflecting an interaction output behavior of a user,
    logic, executed by the processor, for determining robot interaction output information corresponding to the data,
    logic, executed by the processor, for controlling a robot to execute the robot interaction output information, the controlling causing the robot to imitate the interaction output behavior,
    logic, executed by the processor, for detecting an imitation termination instruction, the imitation termination instruction comprising a verbal command issued by the user;
    logic, executed by the processor, for prompting, in response to the imitation termination instruction, the user to provide interaction trigger information corresponding to the robot interaction output information, the interaction trigger information comprising one or more of a voice utterance and a specific motion performed by the user to cause the robot to execute the robot interaction output information,
    logic, executed by the processor, for associating the interaction trigger information with the robot interaction output information,
    logic, executed by the processor, for storing the interaction trigger information and the robot interaction output information, and
    logic, executed by the processor, for performing the robot interaction output information in response to detecting the interaction trigger information.

17. The apparatus of claim 16, the stored program logic further comprising:
    logic, executed by the processor, for collecting second interaction trigger information of an interacting party; and
    logic, executed by the processor, for controlling the robot to execute the robot interaction output information when the second interaction trigger information matches the interaction trigger information.

18. The apparatus of claim 16, the logic for determining robot interaction output information corresponding to the data comprising:
    logic, executed by the processor, for performing facial expression recognition on a color image;
    logic, executed by the processor, for determining an expression object corresponding to a recognized facial expression from a preset expression library; and
    logic, executed by the processor, for setting the robot interaction output information to the expression object.

19. The apparatus of claim 16, the logic for determining robot interaction output information corresponding to the data comprising:
    logic, executed by the processor, for performing bone recognition on a depth image to obtain human joint posture information;
    logic, executed by the processor, for determining robot joint posture information corresponding to the human joint posture information; and
    logic, executed by the processor, for setting the robot interaction output information to the robot joint posture information.

20. The apparatus of claim 16, the logic storing the interaction trigger information and the robot interaction output information comprising logic, executed by the processor, for generating an interaction rule.

* * * * *